US012726422B2

(12) United States Patent
Kobayashi et al.

(10) Patent No.: US 12,726,422 B2
(45) Date of Patent: Sep. 1, 2026

(54) COMMUNICATION DEVICE AND COMMUNICATION SYSTEM CAPABLE OF DETECTING A FAILURE OF A DEVICE CONNECTED TO A COMMUNICATION BUS

(71) Applicants: AutoNetworks Technologies, Ltd., Yokkaichi (JP); Sumitomo Wiring Systems, Ltd., Yokkaichi (JP); Sumitomo Electric Industries, Ltd., Osaka (JP)

(72) Inventors: Nobuyuki Kobayashi, Yokkaichi (JP); Masakatsu Moriguchi, Yokkaichi (JP); Takeshi Hagihara, Yokkaichi (JP); Masaki Kondo, Yokkaichi (JP); Tatsuya Izumi, Osaka (JP); Ryo Yamane, Osaka (JP); Ichiro Kanda, Osaka (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

( * ) Notice: Subject to any disclaimer, the term of this patent is extended or adjusted under 35 U.S.C. 154(b) by 317 days.

(21) Appl. No.: 18/557,548

(22) PCT Filed: Mar. 18, 2022

(86) PCT No.: PCT/JP2022/012716
§ 371 (c)(1),
(2) Date: May 13, 2024

(87) PCT Pub. No.: WO2022/230445
PCT Pub. Date: Nov. 3, 2022

(65) Prior Publication Data

US 2026/0238571 A1 Aug. 13, 2026

(30) Foreign Application Priority Data

Apr. 30, 2021 (JP) ................................ 2021-078008

(51) Int. Cl.
*H04L 43/0805* (2022.01)
*H04L 1/18* (2023.01)

(52) U.S. Cl.
CPC ............ *H04L 43/0805* (2013.01); *H04L 1/18* (2013.01)

(58) Field of Classification Search
CPC .............................. H04L 43/0805; H04L 1/18
See application file for complete search history.

(56) References Cited

U.S. PATENT DOCUMENTS

2006/0109802 A1* 5/2006 Zelig ...................... H04L 45/50 370/258
2009/0268747 A1 10/2009 Kurata et al.
(Continued)

FOREIGN PATENT DOCUMENTS

CN 101278529 A 10/2008
JP S60226246 A 11/1985
(Continued)

OTHER PUBLICATIONS

International Search Report, Application No. PCT/JP2022/230445, mailed Jun. 14, 2022. ISA/Japan Patent Office.
(Continued)

*Primary Examiner* — Farley Abad
(74) *Attorney, Agent, or Firm* — Brooks Kushman P.C.

(57) ABSTRACT

A communication device transmits data through a communication bus. The communication device includes a processing unit that performs processing. When a beacon signal is transmitted, the processing unit determines whether or not a target communication device included in a plurality of second communication devices has transmitted data at a timing at which the target communication device transmits one of data pieces transmitted through the communication bus according to an order set in advance by the communication device itself and the plurality of second communication devices. When it is determined that the target communication device has transmitted no data, the processing unit changes the order. The data transmitted through the com-
(Continued)

munication bus includes dummy data whose transmission destination is different from communication devices other than a transmission source among the communication device itself and the plurality of second communication devices.

9 Claims, 19 Drawing Sheets

(56) References Cited

U.S. PATENT DOCUMENTS

2011/0087396 A1 4/2011 Eregen et al.
2019/0363391 A1 11/2019 Yang et al.
2019/0363991 A1* 11/2019 Sostawa ............ H04L 12/40156

FOREIGN PATENT DOCUMENTS

JP 2007067599 A * 3/2007
JP 2012-134712 A 7/2012
JP 2016-213653 A 12/2016

OTHER PUBLICATIONS

The State Intellectual Property Office of People's Republic of China, Office Action issued for Application No. 202280029508.7, dated Mar. 27, 2026.

* cited by examiner

FIG. 1
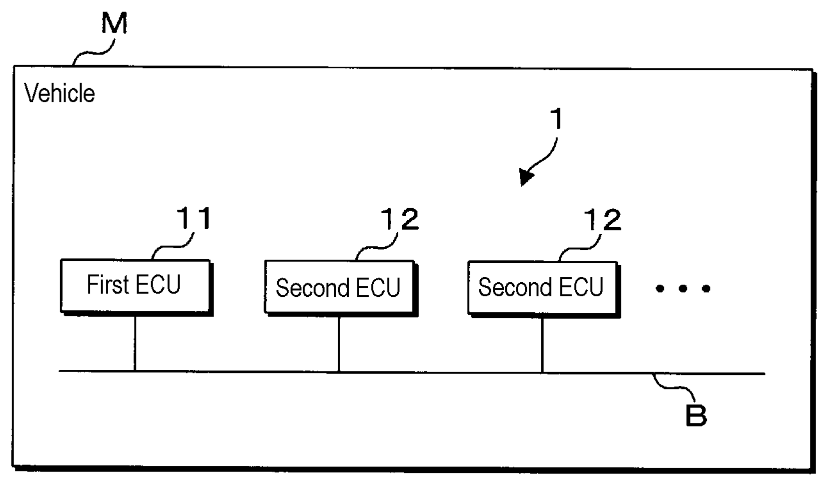
FIG. 2
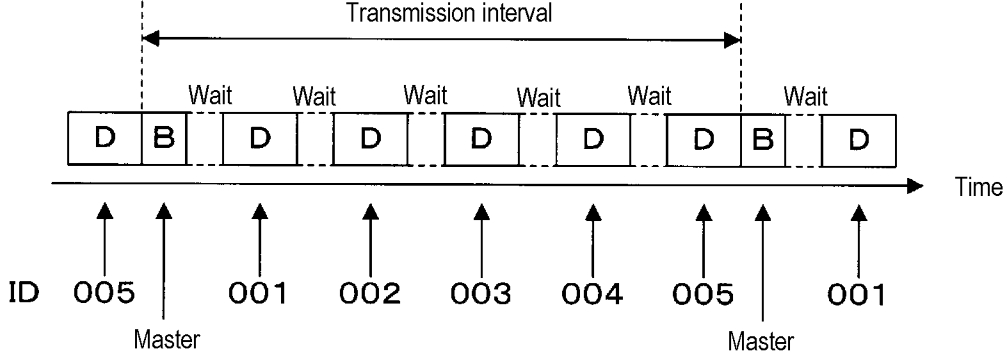
FIG. 3
| | ID | Roles | Transmission turns |
|---|---|---|---|
| First ECU | 001 | Master | First |
| Second ECU | 002 | Slave | Second |
| Second ECU | 003 | Slave | Third |
| Second ECU | 004 | Slave | Fourth |
| Second ECU | 005 | Slave | Fifth |

Data frame

| • • • | Transmission destination field | • • • | Data length field | • • • | Data field | • • • |
|---|---|---|---|---|---|---|

Data frame whose transmission destination is existed->transmission frame

Data frame whose transmission destination is not existed->dummy frame

Order table(before updating)

| ID | Transmission turns |
|---|---|
| 001 | First |
| 002 | Second |
| 003 | Third |
| 004 | Fourth |
| 005 | Fifth |

ECU with 003 is failure

Order table(after updating)

| ID | Transmission turns |
|---|---|
| 001 | First |
| 002 | Second |
| 004 | Third |
| 005 | Fourth |

Legend:
A: Device count

Order table

| A | Waiting period |
|---|---|
| 5 | ··· |
| 4 | ··· |
| 3 | ··· |
| 2 | ··· |

Short ↕ Long

FIG. 19
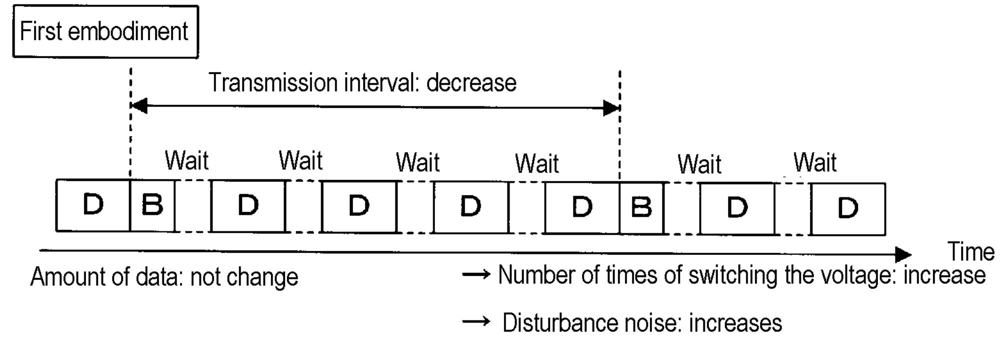
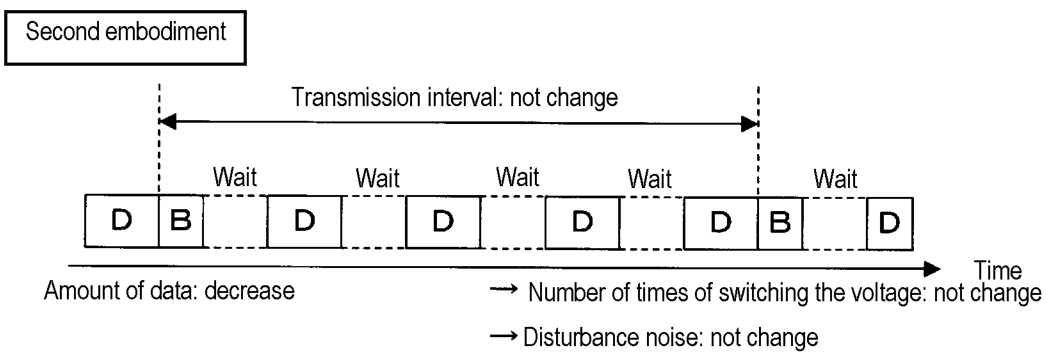

FIG. 21

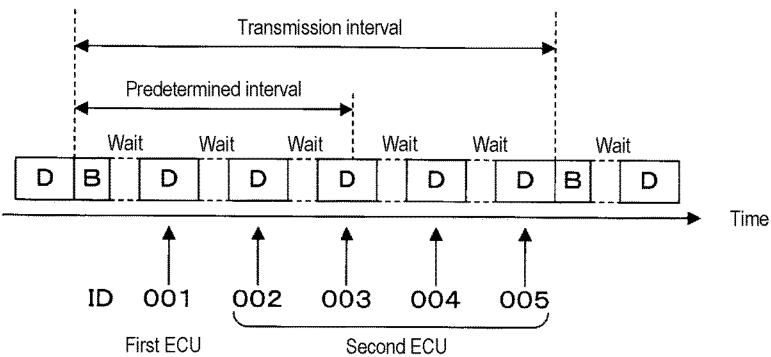

When the number of normal second ECUs is P(=2) or more, the beacon signal transmission interval is equal to or longer than the predetermined interval

When the number of normal second ECUs is P or more, the beacon signal transmission interval is reduced When the number of normal second ECUs is less than P, the beacon signal transmission interval is maintained

FIG. 22

Legend:
A: Device count

Waiting period table

| A | Waiting period |
|---|---|
| 5~8 | ... |
| 4 | ... |
| 3 | ... |
| 2 | ... |

Short ↕ Long

B : Beacon signal

D : Data frame

When U(=3) ECUs transmit data frames, the beacon signal transmission interval is equal to or longer than the predetermined interval ->(N - 1) second ECUs does not transmit a dummy frame When a failure occurs in one of the U(=3) ECUs
one of the (N - U) ECUs starts the transmission of a dummy frame

COMMUNICATION DEVICE AND COMMUNICATION SYSTEM CAPABLE OF DETECTING A FAILURE OF A DEVICE CONNECTED TO A COMMUNICATION BUS

CROSS-REFERENCE TO RELATED APPLICATIONS

This application is the U.S. national stage of PCT/JP2022/012716 filed on Mar. 18, 2022, which claims priority of Japanese Patent Application No. JP 2021-078008 filed on Apr. 30, 2021, the contents of which are incorporated herein.

TECHNICAL FIELD

The present disclosure relates to a communication device and a communication system.

BACKGROUND

Japanese Patent Laid-Open Publication No. 2016-213653 discloses a communication system in which a plurality of communication devices are connected to a communication bus. This communication system is mounted in a vehicle. Each communication device transmits data to other communication devices through the communication bus.

In the communication system described in Japanese Patent Laid-Open Publication No. 2016-213653, failure detection of communication devices is not considered.

Therefore, it is an object to provide a communication device and a communication system capable of detecting a failure of a device connected to a communication bus.

SUMMARY

A communication device according to an aspect of the present disclosure is a communication device for transmitting data through a communication bus, and includes a processing unit that performs processing. When a beacon signal is transmitted, the processing unit determines whether or not a target communication device included in a plurality of second communication devices has transmitted data at a timing at which the target communication device transmits one of data pieces transmitted through the communication bus according to an order set in advance by the communication device itself and the plurality of second communication devices. When it is determined that the target communication device has transmitted no data, the processing unit changes the order. The data transmitted through the communication bus includes dummy data whose transmission destination is different from communication devices other than a transmission source among the communication device itself and the plurality of second communication devices.

A communication system according to an aspect of the present disclosure includes a plurality of communication devices connected to a communication bus. The plurality of communication devices transmit data through the communication bus according to an order set in advance when a beacon signal is transmitted. When there is no transmission data to be transmitted to one of remaining communication devices other than a target communication device included in the plurality of communication devices, the target communication device transmits dummy data whose transmission destination is different from the remaining communication devices. A communication device different from the target communication device among the plurality of communication devices includes a processing unit that performs processing. The processing unit determines whether or not the target communication device has transmitted data at a timing at which the target communication device transmits data, and changes the order when it is determined that the target communication device has transmitted no data.

In addition, not only can the present disclosure be realized as a communication device including such a characteristic processing unit, but also the present disclosure can be realized as a communication method including such characteristic processes as steps or can be realized as a computer program causing a computer to execute such steps. In addition, the present disclosure can be realized as a semiconductor integrated circuit that realizes a part or the entirety of a communication device, or can be realized as a communication system including a communication device.

Effects of Present Disclosure

According to the present disclosure, it is possible to detect a failure of the target communication device.

BRIEF DESCRIPTION OF DRAWINGS

FIG. 1 is a block diagram showing the main configuration of a communication system according to a first embodiment.

FIG. 2 is an explanatory diagram of a data frame transmission method.

FIG. 3 is a chart showing the IDs, roles, and transmission turns of a first ECU and (N−1) second ECUs.

FIG. 19 is an explanatory diagram of the characteristics of the communication systems according to the first and second embodiments.

FIG. 21 is an explanatory diagram of a data frame transmission method according to a third embodiment.

FIG. 22 is a chart showing the contents of a waiting period table.

DETAILED DESCRIPTION OF PREFERRED EMBODIMENTS

Figures 4, 5:
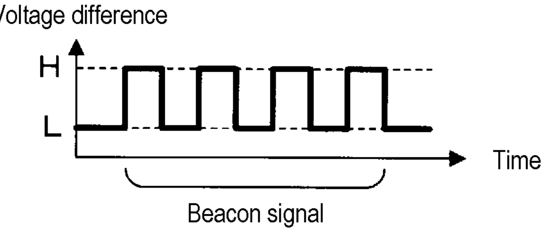
FIG. 4 is a waveform diagram of a beacon signal.
FIG. 5 is an explanatory diagram of the contents of a data frame.

First, embodiments of the present disclosure will be listed and described. At least some of the embodiments described below may be arbitrarily combined.

A communication device according to an aspect of the present disclosure is a communication device for transmitting data through a communication bus, and includes a processing unit that performs processing. When a beacon signal is transmitted, the processing unit determines whether or not a target communication device included in a plurality of second communication devices has transmitted data at a timing at which the target communication device transmits one of data pieces transmitted through the communication bus according to an order set in advance by the communication device itself and the plurality of second communication devices. When it is determined that the target communication device has transmitted no data, the processing unit changes the order. The data transmitted through the communication bus includes dummy data whose transmission destination is different from communication devices other than a transmission source among the communication device itself and the plurality of second communication devices.

In the aspect described above, the data transmitted through the communication bus is received by all devices connected to the communication bus. For example, the target communication device always transmits either transmission data or dummy data to be transmitted to one of the devices connected to the communication bus. A failure is detected by determining whether or not the target communication device has transmitted data. When it is determined that the target communication device has transmitted no data, the transmission order is changed to an order in which the turn of the device that has failed is excluded.

In the communication device according to the aspect of the present disclosure, the processing unit changes the order when it is determined a plurality of times consecutively that the target communication device has transmitted no data.

In the aspect described above, the failure of the target communication device is detected when it is determined a plurality of times consecutively that the target communication device has transmitted no data. Therefore, the possibility of erroneously detecting the failure of the target communication device is low.

The communication device according to the aspect of the present disclosure includes a signal transmission unit that repeatedly transmits the beacon signal.

In the aspect described above, repeated transmission of the beacon signal and failure detection are performed.

The communication device according to the aspect of the present disclosure includes a data transmission unit that transmits data. The data transmission unit transmits data at a timing at which a first predetermined period has passed from an end of transmission of the beacon signal or at a timing at which a second predetermined period has passed from an end of transmission of data from a second communication device with an immediately preceding turn. When it is determined that the target communication device has transmitted no data, the processing unit extends the first predetermined period or the second predetermined period.

In the aspect described above, for example, when a failure of the target communication device is detected, the transmission order is changed to an order in which the turn of the device that has failed is excluded. The beacon signal is transmitted when a device whose turn is the last ends the transmission of data. Since the first predetermined period or the second predetermined period is extended when a failure of the target communication device is detected, it is possible to prevent a decrease in the transmission interval at which the beacon signal is transmitted.

A communication system according to an aspect of the present disclosure includes a plurality of communication devices connected to a communication bus. The plurality of communication devices transmit data through the communication bus according to an order set in advance when a beacon signal is transmitted. When there is no transmission data to be transmitted to one of remaining communication devices other than a target communication device included in the plurality of communication devices, the target communication device transmits dummy data whose transmission destination is different from the remaining communication devices. A communication device different from the target communication device among the plurality of communication devices includes a processing unit that performs processing. The processing unit determines whether or not the target communication device has transmitted data at a timing at which the target communication device transmits data, and changes the order when it is determined that the target communication device has transmitted no data.

In the aspect described above, the data transmitted through the communication bus is received by all devices connected to the communication bus. The target communication device always transmits either transmission data or dummy data. A failure is detected by determining whether or not the target communication device has transmitted data. When it is determined that the target communication device has transmitted no data, the device that has failed changes the transmission order to an order in which the turn of the device that has failed is excluded.

In the communication system according to the aspect of the present disclosure, the plurality of communication devices include a non-transmission device that does not transmit the dummy data. When it is determined that the target communication device has transmitted no data, the processing unit causes the non-transmission device to start transmission of the dummy data.

In the aspect described above, when a failure of the target communication device is detected, the non-transmission device starts the transmission of dummy data. Therefore, it is possible to prevent a decrease in the transmission interval at which the beacon signal is transmitted.

Specific examples of communication systems according to embodiments of the present disclosure will be described below with reference to the diagrams. In addition, the present disclosure is not limited to these examples but is defined by the claims, and is intended to include all modifications within the meaning and scope equivalent to the claims.

First Embodiment

Configuration of Communication System

FIG. 1 is a block diagram showing the main configuration of a communication system 1 according to a first embodiment. The communication system 1 is mounted in a vehicle M. The communication system 1 includes a first ECU 11 and (N−1) second ECUs 12. ECU is an abbreviation for Electronic Control Unit. N is an integer of 3 or more, and is the number of ECUs included in the communication system 1. The first ECU 11 and the (N−1) second ECUs 12 are connected to a communication bus B.

Electrical devices and sensors are connected to the first ECU 11 and the (N−1) second ECUs 12. The electrical devices and the sensors are not shown. Each sensor detects a value related to the vehicle, and outputs the detected detection value to the first ECU 11 or the second ECU 12 connected to the sensor. For example, when the detection value of the sensor is input, each of the first ECU 11 and the (N−1) second ECUs 12 transmits a data frame including the sensor detection value as main data through the communication bus B. The data frame indicates a transmission destination. In addition, the main data is not limited to the detection value of the sensor.

The first ECU 11 detects a failure of the second ECU 12. The failure of the second ECU 12 is a stop of data frame transmission. When the failure of the second ECU 12 is detected, the first ECU 11 transmits, through the communication bus, a data frame including main data indicating the second ECU 12 that has failed. Hereinafter, the main data indicating the second ECU 12 that has failed is referred to as failure data. The transmission destination of the data frame including the failure data is the remaining normal second ECUs 12.

When one of the first ECU 11 and the (N−1) second ECUs 12 transmits a data frame, all of the first ECU 11 and the (N−1) second ECUs 12 receive the data frame. When the data frame is received, each of the first ECU 11 and the (N−1) second ECUs 12 discards the received data frame if the transmission destination of the data frame is not itself.

When the first ECU 11 receives a data frame, if the transmission destination of the data frame is itself, the first ECU 11 determines an operation, which is to be performed by an electrical device connected to itself, based on the main data included in the received data frame. When the second ECU 12 receives a data frame in which the main data is different from the failure data, if the transmission destination of the data frame is not itself, the second ECU 12 determines an operation, which is to be performed by an electrical device connected to itself, based on the main data included in the received data frame.

When the operation to be performed by the electrical device is determined, each of the first ECU 11 and the (N−1) second ECUs 12 outputs an operation signal indicating the determined operation to the electrical device. When the operation signal is input to the electrical device, the electrical device performs the operation indicated by the input operation signal.

The first ECU 11 notifies the normal second ECU 12 of the second ECU 12 that has failed by transmitting a data frame including the failure data. When the first ECU 11 detects a failure of the second ECU 12, each of the first ECU 11 and the normal second ECU 12 perform predetermined failure processing.

Data Frame Transmission Method

FIG. 2 is an explanatory diagram of a data frame transmission method. FIG. 3 is a chart showing the IDs, roles, and transmission turns of the first ECU 11 and the (N−1) second ECUs 12. ID is an abbreviation for Identification Data. In FIGS. 2 and 3, an example in which Nis 5 is shown.

Each of the first ECU 11 and the (N−1) second ECUs 12 transmits a data frame according to, for example, a PLCA (Physical Layer Collision Avoidance) method. As shown in FIG. 2, a beacon signal is repeatedly transmitted through the communication bus B. When the beacon signal is transmitted, five data frames are transmitted through the communication bus B. The beacon signal indicates the start of transmission of a data frame. The beacon signal is transmitted from an ECU serving as a master. The first ECU 11 serves as a master and repeatedly transmits a beacon signal through the communication bus B. Each of the (N−1) second ECUS 12 serves as a slave.

When the first ECU 11 transmits a beacon signal, the first ECU 11 and the (N−1) second ECUs 12 transmit data frames according to an order set in advance. As shown in FIG. 3, an ID is assigned in advance to each of the first ECU 11 and the (N−1) second ECUs 12. In the example of FIG. 3, the ID of the first ECU 11 is 001. One of 002 to 005 is assigned to each of the four second ECUs 12. In FIG. 3, the transmission turns of 001 to 005 are set to first to fifth, respectively. The transmission turn of the master is the first.

When the first ECU 11 transmits a beacon signal, first, the first ECU 11 with an ID of 001 transmits a data frame. Then, the second ECU 12 with an ID of 002 transmits a data frame. Thereafter, the three second ECUs 12 corresponding to 003 to 005 transmit data frames in order. The first ECU 11 transmits the beacon signal again when the second ECU 12 with an ID of 005 ends the transmission of the data frame.

The first ECU 11 waits until a waiting period passes from the end of the transmission of the beacon signal. The waiting period is a fixed value, and is set in advance. The first ECU 11 transmits a data frame when the waiting period has passed. Each second ECU 12 waits until the waiting period passes from the end of the transmission of the data frame. Each second ECU 12 transmits a data frame when the waiting period has passed. The waiting period corresponds to a first predetermined period and a second predetermined period.

As described above, for example, in the PLCA method, the first ECU 11 serving as a master and the (N−1) second ECUs 12 serving as slaves are synchronized using a beacon signal, thereby avoiding data collision. When N is not 5, the first ECU 11 and the (N−1) second ECUs 12 transmit data frames according to a predetermined order, as in the case where N is 5.

Beacon Signal

FIG. 4 is a waveform diagram of a beacon signal. The vertical and horizontal axes of FIG. 4 indicate the voltage difference and time, respectively. The waveform of the beacon signal shown in FIG. 4 is an example. The communication bus B includes a first conducting wire W1 and a second conducting wire W2 (see FIG. 7). The first conducting wire W1 and the second conducting wire W2 are twisted together. Therefore, a twisted wire pair is realized. The beacon signal has a plurality of bits. Each of the first ECU 11 and the (N−1) second ECUs 12 transmits a beacon signal by adjusting the voltage difference between the first conducting wire W1 and the second conducting wire W2 included in the communication bus B to a high level voltage or a low level voltage each time a period of one bit passes. In FIG. 4, H and L indicate high a level voltage and a low level voltage, respectively.

Each of the first ECU 11 and the (N−1) second ECUs 12 transmit a data frame by adjusting the voltage difference between the first conducting wire W1 and the second conducting wire W2 included in the communication bus B to a high level voltage or a low level voltage each time a period of one bit passes.

Each bit indicates a high level voltage or a low level voltage. In the example of FIG. 4, the beacon signal has seven bits. A high level voltage and a low level voltage are alternately output. In addition, the number of bits forming the beacon signal is not limited to seven.

The waveform of the beacon signal is set in advance. When the first ECU 11 transmits a beacon signal through the communication bus B, all the second ECUs 12 receive the beacon signal. In each second ECU 12, a clock signal formed by the high level voltage and the low level voltage is output. In the clock signal, voltage rise or fall is periodically performed. The voltage rise is a switch from the low level voltage to the high level voltage. The voltage fall is a switch from the high level voltage to the low level voltage. When the beacon signal is received, each second ECU 12 adjusts the rising or falling time of the clock signal. Each of the second ECUs 12 adjusts the rising or falling time to the end time of the beacon signal, for example.

Here, in a configuration in which processing is performed at the rising time of the clock signal, the rising time of the clock signal is adjusted. In a configuration in which processing is performed at the falling time of the clock signal, the falling time of the clock signal is adjusted.

Each second ECU 12 adjusts the rising or falling time of the clock signal, thereby realizing synchronization between the first ECU 11 and the (N−1) second ECUs 12. As a result, the timings at which the first ECU 11 and the (N−1) second ECUs 12 perform processes substantially match each other. In addition, the waveform of the beacon signal is not limited to the waveform shown in FIG. 4.

Contents of Data Frame

FIG. 5 is an explanatory diagram of the contents of a data frame. A data frame includes a transmission destination field, a data length field, and a data field. A data frame is data and has a plurality of bits. Each bit outputs a high level voltage or a low level voltage. Bit values of 1 and 0 respectively correspond to a high level voltage and a low level voltage, for example.

The transmission destination field of the data frame indicates the transmission destination of the data frame. For example, an ID is shown in the transmission destination field. The data field of the data frame includes main data. As described above, the main data is, for example, a detection value of a sensor. The data length field of the data frame indicates the length of the main data. The unit of the length of the main data is a bit.

Regarding the data frame, the number of bits forming a portion other than the data field is fixed. Once the length of the main data is determined, the length of the data frame is determined. The number of bits forming the main data changes. However, the upper limit of the number of bits forming the main data is set in advance.

Each of the first ECU 11 and the (N−1) second ECUs 12 transmits a data frame whose transmission destination is an ECU other than the transmission source among the ECUs connected to the communication bus B. Hereinafter, this data frame is referred to as a transmission frame. The transmission frame corresponds to transmission data. A data frame including failure data is a transmission frame.

As shown in FIG. 3, when five IDs are assigned, the transmission destination of a transmission frame transmitted from the first ECU 11 with an ID of 001 is at least one of the four second ECUs 12 corresponding to 002 to 005. In a similar case, the transmission destination of a transmission frame transmitted from the second ECU 12 with an ID of 002 is at least one of the first ECU 11 corresponding to 001 and the three second ECUs 12 corresponding to 003 to 005.

Each of the first ECU 11 and the (N−1) second ECUs 12 further transmits a data frame whose transmission destination is different from the first ECU 11 and the (N−1) second ECUs 12. Hereinafter, this data frame is referred to as a dummy frame. The dummy frame corresponds to dummy data.

As shown in FIG. 3, when five IDs are assigned, the transmission destination of the dummy frame is different from any of the first ECU 11 corresponding to 001 and the four second ECUs 12 corresponding to 002 to 005. The transmission destination of the dummy frame is, for example, an ECU with an ID of 999.

As described above, when the data frame is received, each of the first ECU 11 and the (N−1) second ECUs 12 discards the received data frame if the transmission destination of the data frame is different from itself. Therefore, when a dummy frame is transmitted, each of the first ECU 11 and the (N−1) second ECUs 12 discards the received dummy frame.

As described above, there is no transmission destination of the dummy frame among the ECUs connected to the communication bus B. Therefore, the transmission destination of the dummy frame is different from any of the ECUs connected to the communication bus B other than the transmission source.

Configuration of First ECU 11

Figure 6:
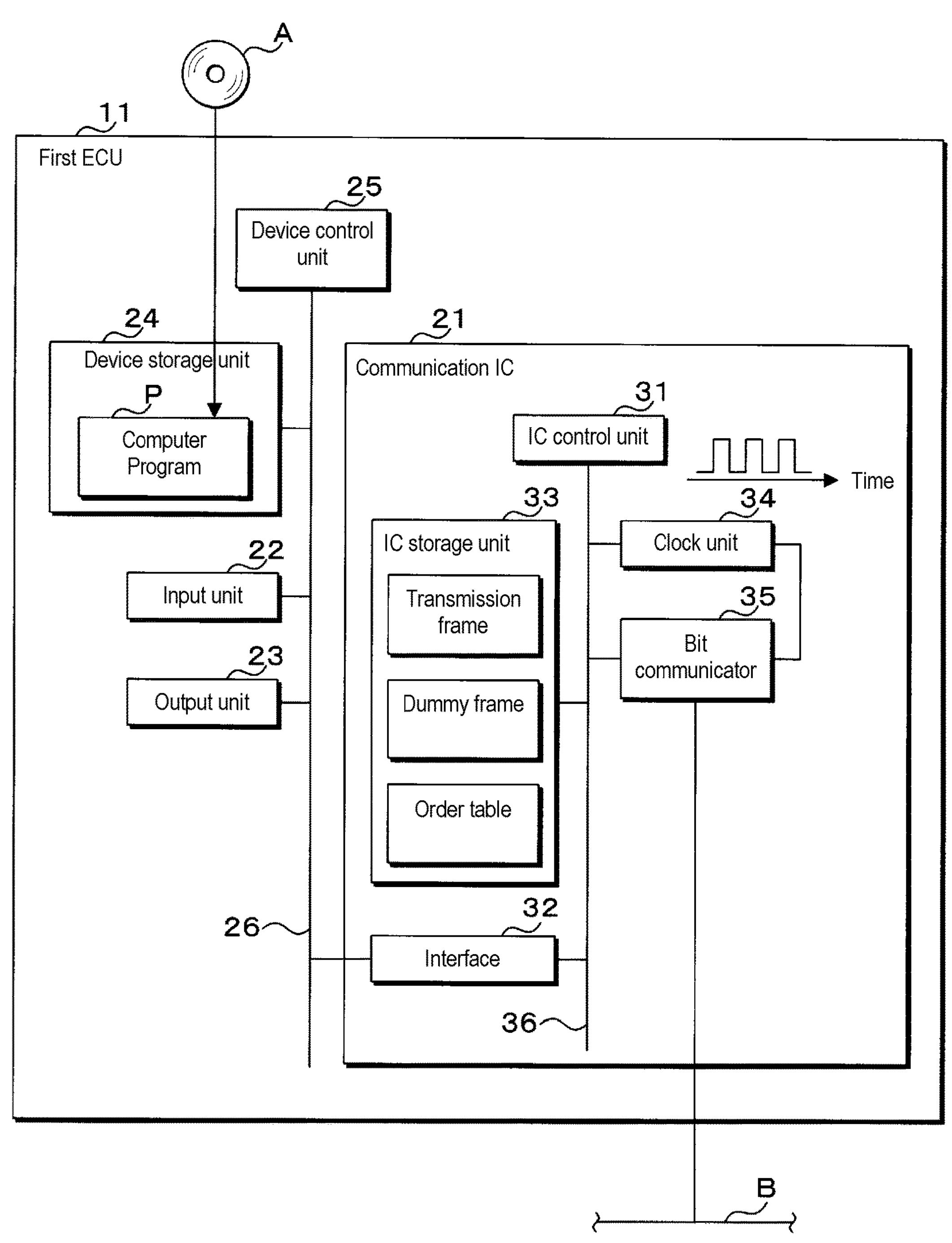
FIG. 6 is a block diagram showing the main configuration of the first ECU.

FIG. 6 is a block diagram showing the main configuration of the first ECU 11. The first ECU 11 includes a communication IC 21, an input unit 22, an output unit 23, a device storage unit 24, and a device control unit 25. IC is an abbreviation for Integrated Circuit. The communication IC 21, the input unit 22, the output unit 23, the device storage unit 24, and the device control unit 25 are connected to a device bus 26. The communication IC 21 is further connected to the communication bus B. The input unit 22 is further connected to a sensor. The output unit 23 is further connected to an electrical device. The electrical device and the sensor are not shown.

The sensor outputs the detection value to the input unit 22. For example, when a sensor detection value is input to the input unit 22, the device control unit 25 generates a transmission frame including the sensor detection value as main data. The device control unit 25 provides the generated transmission frame to the communication IC 21. When the transmission frame is provided, the communication IC 21 transmits the given transmission frame through the communication bus B.

The communication IC 21 receives the data frame transmitted through the communication bus B. When the data frame is received, the communication IC 21 discards the received data frame if the transmission destination of the received data frame is different from the first ECU 11. Therefore, when a dummy frame is received, the communication IC 21 discards the received dummy frame.

When the data frame is received, the communication IC 21 provides the received data frame to the device control unit 25 when the transmission destination of the received data frame is the first ECU 11. The data frame whose transmission destination is the first ECU 11 is a transmission frame. As described above, the transmission destination of the data frame including the failure data is the second ECU 12. For this reason, no failure data is included in the transmission frame whose transmission destination is the first ECU 11.

When the received transmission frame is provided, the device control unit 25 determines an operation to be performed by the electrical device based on the main data of the provided transmission frame. When the operation to be performed by the electrical device is determined, the device control unit 25 instructs the output unit 23 to output an operation signal indicating the determined operation to the electrical device. As described above, when the operation signal is input, the electrical device performs the operation indicated by the input operation signal.

The communication IC 21 detects a failure of the second ECU 12. When a failure of the second ECU 12 is detected, the communication IC 21 transmits a transmission frame including failure data. The transmission destination of the transmission frame is the normal second ECU 12.

The device storage unit 24 is, for example, a non-volatile memory. A computer program P is stored in the device storage unit 24. The device control unit 25 includes a processing element that performs processing, for example, a CPU (Central Processing Unit). The processing element of the device control unit 25 executes the computer program P to perform transmission frame generation processing and signal output processing in parallel. In the transmission frame generation processing, the device control unit 25 generates a transmission frame as described above and provides the generated transmission frame to the communication IC 21. In the signal output processing, the device control unit 25 instructs the output unit 23 to output an operation signal as described above.

In addition, the computer program P may be provided to the first ECU 11 by using a non-temporary storage medium A in which the computer program P is recorded in a readable manner. The storage medium A is, for example, a portable memory. Examples of the portable memory include a CD-ROM, a USB (Universal Serial Bus) memory, an SD card, a micro SD card, and a compact flash (registered trademark). If the storage medium A is a portable memory, the processing element of the device control unit 25 may read the computer program P from the storage medium A by using a reader (not shown). The read computer program P is stored in the device storage unit 24. In addition, the computer program P may be provided to the first ECU 11 by a communication unit (not shown) of the first ECU 11 communicating with an external device. In this case, the processing element of the device control unit 25 acquires the computer program P through the communication unit. The acquired computer program P is stored in the device storage unit 24.

Configuration of Communication IC 21

The communication IC 21 includes an IC control unit 31, an interface 32, an IC storage unit 33, a clock unit 34, and a bit communicator 35. These are connected to an IC bus 36. The interface 32 is further connected to the device bus 26. The clock unit 34 is further connected to the bit communicator 35. The bit communicator 35 is further connected to the communication bus B.

The device control unit 25 provides a transmission frame to the IC control unit 31 through the interface 32. The IC control unit 31 includes a processing element that performs processing, for example, a CPU, and functions as a processing unit. When the transmission frame is provided, the IC control unit 31 writes the provided transmission frame in the IC storage unit 33. The IC storage unit 33 is, for example, a non-volatile memory. A dummy frame is stored in advance in the IC storage unit 33.

The IC control unit 31 detects a failure of the second ECU 12. When a failure of the second ECU 12 is detected, the IC control unit 31 generates a transmission frame including failure data indicating the second ECU 12 that has failed. The IC control unit 31 writes the generated transmission frame in the IC storage unit 33.

The clock unit 34 outputs a clock signal to the bit communicator 35. The IC control unit 31 provides the transmission frame or the dummy frame stored in the IC storage unit 33 to the bit communicator 35 bit by bit. The IC control unit 31 provides a beacon signal to the bit communicator 35 bit by bit.

The bit communicator 35 transmits a one-bit signal or one-bit data provided from the IC control unit 31 each time the clock signal rises. The bit communicator 35 transmits a one-bit signal or one-bit data by adjusting the voltage difference between the first conducting wire W1 and the second conducting wire W2 included in the communication bus B to a high level voltage or a low level voltage. The voltage difference is maintained at the high level voltage or the low level voltage during one period of the clock signal. The period of the clock signal corresponds to the period of one bit.

The bit communicator 35 receives a one-bit signal or one-bit data by detecting the voltage difference between the first conducting wire W1 and the second conducting wire W2 included in the communication bus B each time the clock signal rises. The bit communicator 35 notifies the IC control unit 31 of the received one-bit signal or one-bit data.

In addition, the bit communicator 35 may transmit the one-bit data provided from the IC control unit 31 each time the clock signal falls. The bit communicator 35 may receive a one-bit signal or one-bit data by detecting the voltage difference of the communication bus B each time the clock signal falls.

When the bit communicator 35 receives the data frame, the IC control unit 31 discards the received data frame if the transmission destination of the received data frame is not the first ECU 11. Therefore, when the bit communicator 35 receives a dummy frame, the IC control unit 31 discards the received dummy frame. When the bit communicator 35 receives the data frame, if the transmission destination of the received data frame is the first ECU 11, the IC control unit 31 provides the received data frame to the device control unit 25 through the interface 32. As described above, the data frame provided to the device control unit 25 by the IC control unit 31 provides is a transmission frame.

A computer program (not shown) is stored in the IC storage unit 33. The IC control unit 31 performs writing processing, transmission processing, reception processing, failure detection processing, and update processing in parallel by executing the computer program. In the writing processing, the IC control unit 31 writes the transmission frame in the IC storage unit 33 as described above. In the transmission processing, the IC control unit 31 causes the bit communicator 35 to transmit a beacon signal. After causing the bit communicator 35 to transmit the beacon signal, the IC control unit 31 causes the bit communicator 35 to transmit a transmission frame or a dummy frame. In the reception processing, the IC control unit 31 performs processing related to the data frame received by the bit communicator 35 as described above. In the failure detection processing, the IC control unit 31 detects a failure of the second ECU 12. In the update processing, the IC control unit 31 updates the order table.

The IC storage unit 33 stores an order table indicating the order of transmission performed by the first ECU 11 and the (N−1) second ECUs 12. In the transmission processing, the IC control unit 31 causes the bit communicator 35 to transmit transmission frames or dummy frames according to the order indicated by the order table. In the order table, as shown in FIG. 3, the turn of transmission is shown in association with each of the N IDs.

Configuration of Bit Communicator 35

Figure 7:
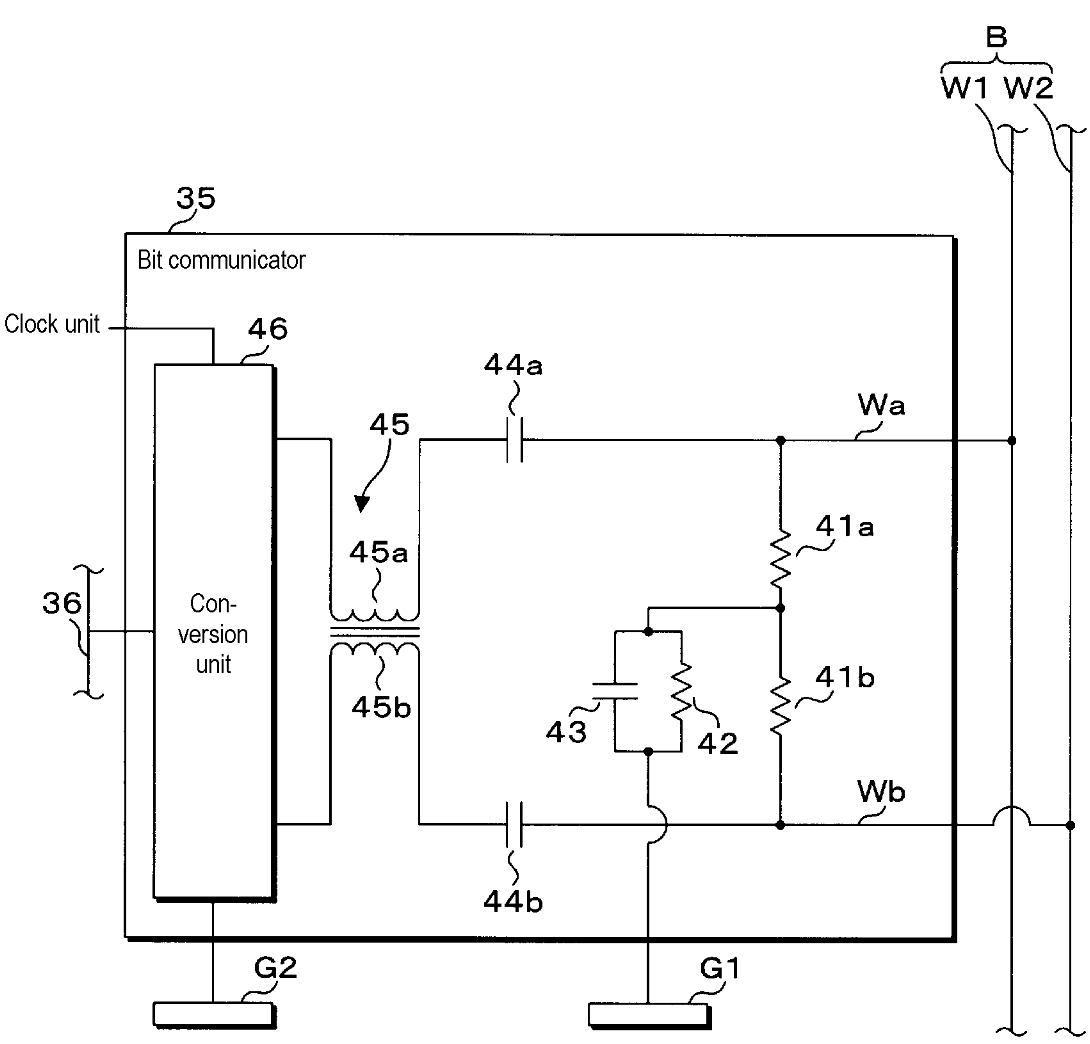
FIG. 7 is a circuit diagram of a bit communicator.

FIG. 7 is a circuit diagram of the bit communicator 35. The bit communicator 35 includes three resistors 41*a*, 41*b*, and 42, three capacitors 43, 44*a*, and 44*b*, a common mode choke coil 45, and a conversion unit 46. The common mode choke coil 45 includes a first inductor 45*a*, a second inductor 45*b*, and an annular magnetic body. Each of the first inductor 45*a* and the second inductor 45*b* is wound around the magnetic body.

The conversion unit 46 of the bit communicator 35 is connected to the first conducting wire W1 of the communication bus B by a device conducting wire Wa. The conversion unit 46 of the bit communicator 35 is connected to the second conducting wire W2 of the communication bus B by a device conducting wire Wb. The conversion unit 46 is further connected to the clock unit 34 and the IC bus 36.

The capacitor 44*a* and the first inductor 45*a* are arranged in the middle of the device conducting wire Wa. The capacitor 44*a* is arranged on the first conducting wire W1 side of the first inductor 45*a*. Similarly, the capacitor 44*b* and the second inductor 45*b* are arranged in the middle of the device conducting wire Wb. The capacitor 44*b* is arranged on the second conducting wire W2 side of the second inductor 45*b*.

On the first conducting wire W1 side of the capacitor 44*a*, one end of the resistor 41*a* is connected to the device conducting wire Wa. Similarly, on the second conducting wire W2 side of the capacitor 44*b*, one end of the resistor 41*b* is connected to the device conducting wire Wb. The other end of the resistor 41*a* is connected to the other end of the resistor 41*b*. A connection node between the resistors 41*a* and 41*b* is connected to one end of the resistor 42 and one end of the capacitor 43. The other ends of the resistor 42 and the capacitor 43 are connected to a first conductor G1. The first conductor G1 is arranged in the first ECU 11.

The resistors 41*a*, 41*b*, and 42 and the capacitor 43 function as a terminating circuit to suppress reflection of a signal or data represented by the voltage difference between the first conducting wire W1 and the second conducting wire W2. The two capacitors 44*a* and 44*b* remove DC components from the two voltages input from the two device conducting wires Wa and Wb. The capacitors 44*a* and 44*b* output two voltages, from which DC components have been removed, to the common mode choke coil 45.

The common mode choke coil 45 removes common mode noise from the two voltages output from the capacitors 44*a* and 44*b* and outputs two voltages, from which the common mode noise has been removed, to the conversion unit 46.

The conversion unit 46 detects a voltage difference between the two voltages input from the common mode choke coil 45 each time the clock signal input from the clock unit 34 rises or falls. When the voltage difference is detected, the conversion unit 46 outputs a bit value corresponding to the detected voltage difference to the IC control unit 31. The bit value is 0 or 1. For example, if the voltage difference is a low level voltage, 0 is output as a bit value. If the voltage difference is a high level voltage, 1 is output as a bit value. The bit value is represented by a voltage whose reference potential is the potential of a second conductor G2. Bit values of 1 and 0 respectively correspond to a high level voltage and a low level voltage whose reference potential is the second conductor G2, for example. The second conductor G2 is arranged inside the first ECU 11, and is different from the first conductor G1.

As described above, the bit communicator 35 transmits a one-bit signal or one-bit data. The IC control unit 31 provides the one-bit signal or one-bit data to the conversion unit 46. The conversion unit 46 adjusts the voltage difference between the two device conducting wires Wa and Wb to a voltage corresponding to the one-bit signal or one-bit data provided from the IC control unit 31 each time the clock signal input from the clock unit 34 rises or falls.

The two voltages output from the conversion unit 46 are input to the common mode choke coil 45. The common mode choke coil 45 removes common mode noise from the two voltages output from the conversion unit 46 and outputs two voltages, from which the common mode noise has been removed, to the two capacitors 44*a* and 44*b*. The two capacitors 44*a* and 44*b* remove DC components from the two voltages input from the common mode choke coil 45. The capacitors 44*a* and 44*b* apply two voltages, from which DC components have been removed, to the first conducting wire W1 and the second conducting wire W2 of the communication bus B, respectively. As a result, the voltage difference between the first conducting wire W1 and the second conducting wire W2 is adjusted to a high level voltage or a low level voltage.

The configuration of the bit communicator 35 conforms to 10BASE-TIS of IEEE802.3cg (IEEE is a registered trademark). Therefore, the bit communicator 35 is configured to realize the transmission of a baseband signal with a data rate of 10 Mbps. Here, the baseband signal is transmitted through a twisted wire pair including the first conducting wire W1 and the second conducting wire W2. IEEE is an abbreviation for Institute of Electrical and Electronics Engineers.

Configuration of Second ECU 12

In the configuration of the second ECU 12, other components excluding the components related to the reception of the data frame and the transmission of the beacon signal are configured in the same manner as in the first ECU 11. In the description of the configuration of the first ECU 11, the first ECU 11 is replaced with the second ECU 12. In this manner, the configuration of the second ECU 12 can be explained.

When the bit communicator 35 receives the data frame, the IC control unit 31 discards the received data frame if the transmission destination of the received data frame is not the second ECU 12. Therefore, when the bit communicator 35 receives a dummy frame, the IC control unit 31 discards the received dummy frame. When the bit communicator 35 receives the data frame, if the transmission destination of the received data frame is the second ECU 12 (itself), the IC control unit 31 determines whether or not the main data of the data frame is failure data.

The IC storage unit 33 stores failure data. If there is no second ECU 12 that has failed, the failure data indicates no failure. When it is determined that the main data is failure data, the IC control unit 31 updates the failure data stored in the IC storage unit 33 to the failure data included in the received data frame. When it is determined that the main data is not failure data, the IC control unit 31 provides the received data frame to the device control unit 25 through the interface 32.

In the second ECU 12, the IC control unit 31 does not provide the beacon signal to the bit communicator 35. The bit communicator 35 receives a beacon signal. When the beacon signal is received, the IC control unit 31 adjusts the rising or falling time of the clock signal based on the received beacon signal, as described in the description of the beacon signal. In a configuration in which processing is performed at the rising time of the clock signal, the rising time of the clock signal is adjusted. In a configuration in which processing is performed at the falling time of the clock signal, the falling time of the clock signal is adjusted.

Similarly to the IC control unit 31 of the first ECU 11, the IC control unit 31 of the second ECU 12 performs writing processing, transmission processing, and update processing. However, in the transmission processing of the second ECU 12, the IC control unit 31 adjusts the clock signal based on the beacon signal received by the bit communicator 35 and then causes the bit communicator 35 to transmit a transmission frame or a dummy frame. In the reception process of the second ECU 12, the IC control unit 31 performs processing related to the data frame received by the bit communicator 35 as described above. The IC control unit 31 of the second ECU 12 does not detect a failure.

Procedure for Transmitting Data Frame

Figure 8:
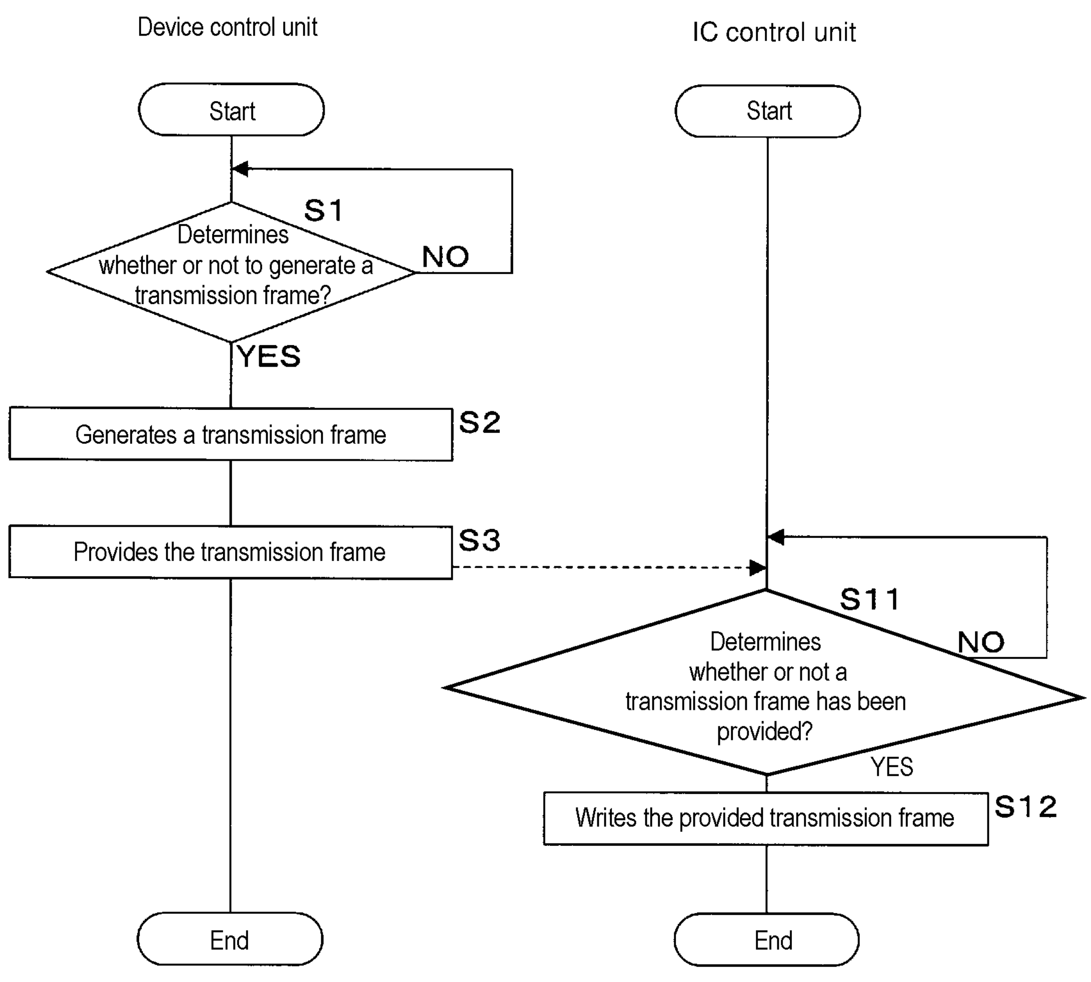
FIG. 8 is a flowchart showing a procedure for preparing for transmission of a transmission frame.

FIG. 8 is a flowchart showing a procedure for preparing for transmission of a transmission frame. In the first ECU 11 and the (N−1) second ECUs 12, preparation for transmission of the transmission frame is performed in the same manner. FIG. 8 shows transmission frame generation processing of the device control unit 25 and writing processing of the IC control unit 31.

In the transmission frame generation processing, first, the device control unit 25 determines whether or not to generate a transmission frame (step S1). In step S1, for example, when a detection value of a sensor is input to the input unit 22, the device control unit 25 determines that a transmission frame is to be generated. In this case, the main data of the transmission frame is the sensor detection value input to the input unit 22. When it is determined that no transmission frame is to be generated (S1: NO), the device control unit 25 executes step S1 again and waits until the timing to generate a transmission frame arrives.

When it is determined that a transmission frame is to be generated (S1: YES), the device control unit 25 generates a transmission frame (step S2). For example, each time step S2 is executed, the device control unit 25 may always generate a transmission frame having a predetermined data length. The predetermined length is, for example, the upper limit of the number of bits forming the data field of the data frame. When the data length is fixed, the number of bits forming the transmission frame generated by the device control unit 25 is always constant. In a configuration in which a transmission frame having a predetermined data length is generated, the data length of a dummy frame may also be the predetermined length. In this case, the number of bits forming the dummy frame is the same as the number of bits forming the transmission frame.

Then, the device control unit 25 provides the transmission frame generated in step S2 to the IC control unit 31 through the interface 32 (step S3). After executing step S3, the device control unit 25 ends the transmission frame generation processing. After the transmission frame generation processing ends, the device control unit 25 performs the transmission frame generation processing again.

In the writing processing, first, the IC control unit 31 determines whether or not a transmission frame has been provided from the device control unit 25 (step S11). When it is determined that no transmission frame has been provided (S11: NO), the IC control unit 31 executes step S11 again and waits until the transmission frame is provided from the device control unit 25.

When it is determined that the transmission frame has been provided from the device control unit 25 (S11: YES), the IC control unit 31 writes the provided transmission frame in the IC storage unit 33 (step S12). After executing step S12, the IC control unit 31 ends the writing processing. After the writing processing ends, the IC control unit 31 performs the writing processing again.

As described above, when the device control unit 25 generates a transmission frame, the generated transmission frame is written in the IC storage unit 33. The transmission frame stored in the IC storage unit 33 is transmitted through the communication bus B.

Figure 9:
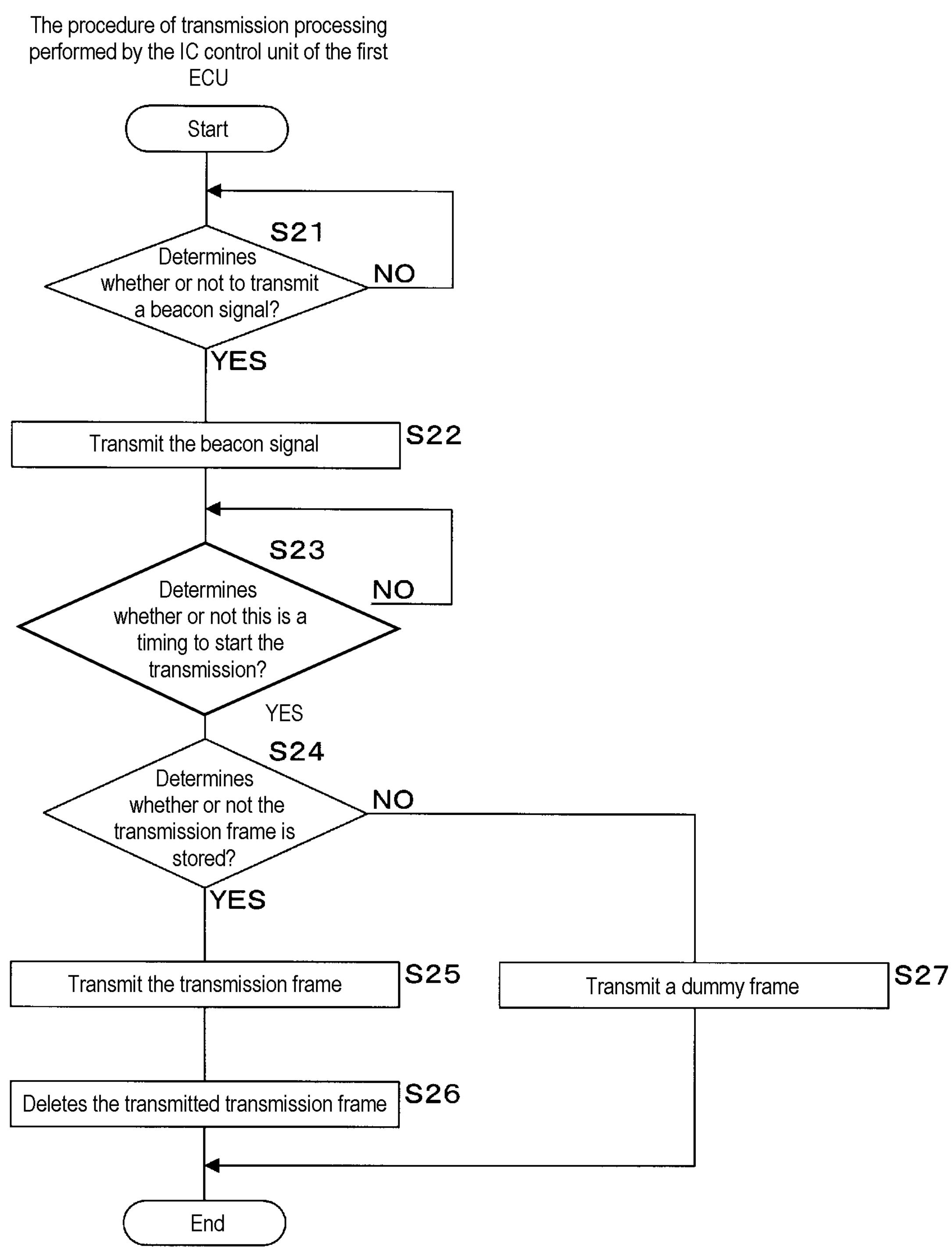
FIG. 9 is a flowchart showing the procedure of transmission processing performed by an IC control unit of the first ECU.

FIG. 9 is a flowchart showing the procedure of transmission processing performed by the IC control unit 31 of the first ECU 11. In the transmission processing, first, the IC control unit 31 of the first ECU 11 determines whether or not to transmit a beacon signal (step S21). When the waiting period has passed, if the second ECU 12 whose turn is the last starts transmitting the data frame, the time when the second ECU 12 ends the transmission of the data frame is the timing at which the beacon signal is transmitted. When the waiting period has passed, if the second ECU 12 whose turn is the last does not start the transmission of the data frame, the time when the waiting period has passed is the timing at which the beacon signal is transmitted. As described above, in the data length field of the data frame, the data length of the main data is shown. The IC control unit 31 can grasp the timing at which the transmission of the data frame ends based on the data length shown in the data length field of the data frame that is being transmitted from the second ECU 12 whose turn is the last.

When it is determined that no beacon signal is to be transmitted (S21: NO), the IC control unit 31 executes step S21 again and waits until the timing to transmit the beacon signal arrives. When it is determined that the beacon signal is to be transmitted (S21: YES), the IC control unit 31 instructs the bit communicator 35 to transmit the beacon signal through the communication bus B (step S22). As described above, in the second ECU 12, when the bit communicator 35 receives the beacon signal, the IC control unit 31 adjusts the clock signal.

After executing step S22, the IC control unit 31 determines whether or not this is a timing to start the transmission of a data frame (step S23). Since the first ECU 11 serves as a master, the transmission turn of the first ECU 11 is the first. In this case, in step S23, the IC control unit 31 determines whether or not the waiting period has passed from the end of the transmission of the beacon signal. The timing at which the waiting period has passed is a timing at which transmission is started. When it is determined that this is not the timing to start transmission (S23: NO), the IC control unit 31 executes step S23 again and waits until the timing to start transmission arrives.

When it is determined that this is the timing to start transmission (S23: YES), the IC control unit 31 determines whether or not the transmission frame is stored in the IC storage unit 33 (step S24). When it is determined that the transmission frame is stored in the IC storage unit 33 (S24: YES), the IC control unit 31 instructs the bit communicator 35 to transmit the transmission frame stored in the IC storage unit 33 bit by bit through the communication bus B (step S25). The bit communicator 35 functions as a data transmission unit. After executing step S25, the IC control unit 31 deletes the transmitted transmission frame from the IC storage unit 33 (step S26).

When it is determined that no transmission frame is stored in the IC storage unit 33 (S24: NO), the IC control unit 31 instructs the bit communicator 35 to transmit a dummy frame stored in the IC storage unit 33 bit by bit (step S27). After executing one of steps S26 and S27, the IC control unit 31 ends the transmission processing. After the transmission processing ends, the IC control unit 31 performs the transmission processing again. Since the transmission processing is repeatedly performed, the bit communicator 35 repeatedly transmits the beacon signal. The bit communicator 35 also functions as a signal transmission unit.

Figure 10:
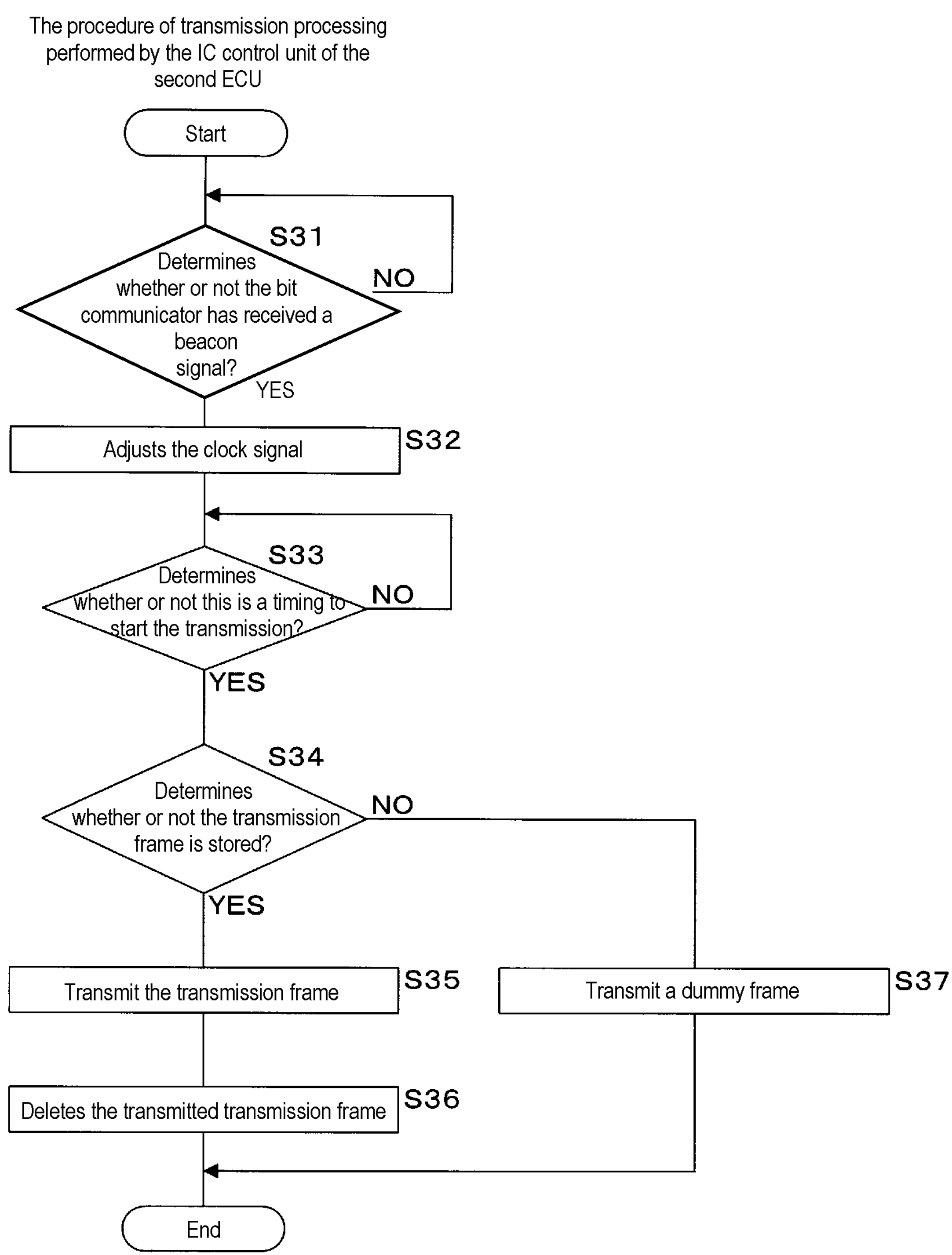
FIG. 10 is a flowchart showing the procedure of transmission processing performed by an IC control unit of the second ECU.

FIG. 10 is a flowchart showing the procedure of transmission processing performed by the IC control unit 31 of the second ECU 12. Steps S34 to S37 of the transmission processing performed by the IC control unit 31 of the second ECU 12 are the same as steps S24 to S27 of the transmission processing performed by the IC control unit 31 of the first ECU 11. Therefore, the description of steps S34 to S37 will be omitted.

In the transmission processing, first, the IC control unit 31 of the second ECU 12 determines whether or not the bit communicator 35 has received a beacon signal (step S31). When it is determined that the bit communicator 35 has not received the beacon signal (S31: NO), the IC control unit 31 executes step S31 again and waits until the bit communicator 35 receives the beacon signal.

When it is determined that the bit communicator 35 has received the beacon signal (S31: YES), the IC control unit 31 adjusts the clock signal output from the clock unit 34 (step S32). In step S32, the IC control unit 31 adjusts the rising or falling time of the clock signal as described above. After executing step S32, the IC control unit 31 determines whether or not this is a timing to start the transmission of a data frame (step S33).

When the turns of transmission are assigned as shown in FIG. 3, in step S33, the IC control unit 31 assumes that the first ECU 11 or the second ECU 12 with an immediately preceding turn in the order table has started the transmission of the data frame when the waiting period has passed. In this case, the time when the waiting period has passed from the end of the transmission of the data frame from the first ECU 11 or the second ECU 12 with an immediately preceding turn is a timing at which transmission is started. When a waiting period has passed, if the first ECU 11 or the second ECU 12 with an immediately preceding turn does not start the transmission of the data frame, the time when a further waiting period has passed from the time when the waiting period has passed is a timing at which the transmission of the data frame is started.

For the second ECU 12 with an ID of 002, an ECU with an immediately preceding turn is the first ECU 11 with an ID of 001. For the second ECU 12 with an ID of 003, an ECU with an immediately preceding turn is the second ECU 12 with an ID of 002.

The IC control unit 31 can grasp the timing at which the first ECU 11 or the second ECU 12 ends the transmission of the data frame based on the data length shown in the data length field of the data frame that is being transmitted from the first ECU 11 or the second ECU 12 with an immediately preceding turn.

When it is determined that this is not the timing to start the transmission of the data frame (S33: NO), the IC control unit 31 executes step S33 and waits until the timing to start the transmission of the data frame arrives. When it is determined that this is the timing to start the transmission of the data frame (S33: YES), the IC control unit 31 executes step S34. After the transmission processing ends, the IC control unit 31 performs the transmission processing again.

As described above, the bit communicator 35 of each of the first ECU 11 and the (N−1) second ECUs 12 transmits a dummy frame when there is no transmission frame, which is to be transmitted to the remaining ECUs other than itself, in the IC storage unit 33. Therefore, the bit communicator 35 of each of the first ECU 11 and the (N−1) second ECUs 12 always transmits a transmission frame or a dummy frame when the turn of transmission comes.

In addition, for the first ECU 11 and the (N−1) second ECUs 12, the order of transmitting data frames is set in advance as shown in FIG. 3. Therefore, when the beacon signal is transmitted, the bit communicator 35 of each of the first ECU 11 and the (N−1) second ECUs 12 transmits the data frame through the communication bus B according to the order set in advance. The beacon signal indicates the start of data frame transmission performed by the bit communicator 35 of each of the first ECU 11 and the (N−1) second ECUs 12. Each of the first ECU 11 and the second ECU 12 functions as a communication device that transmits data. The second ECU 12 also functions as a second communication device.

Failure Detection Processing

Figure 11:
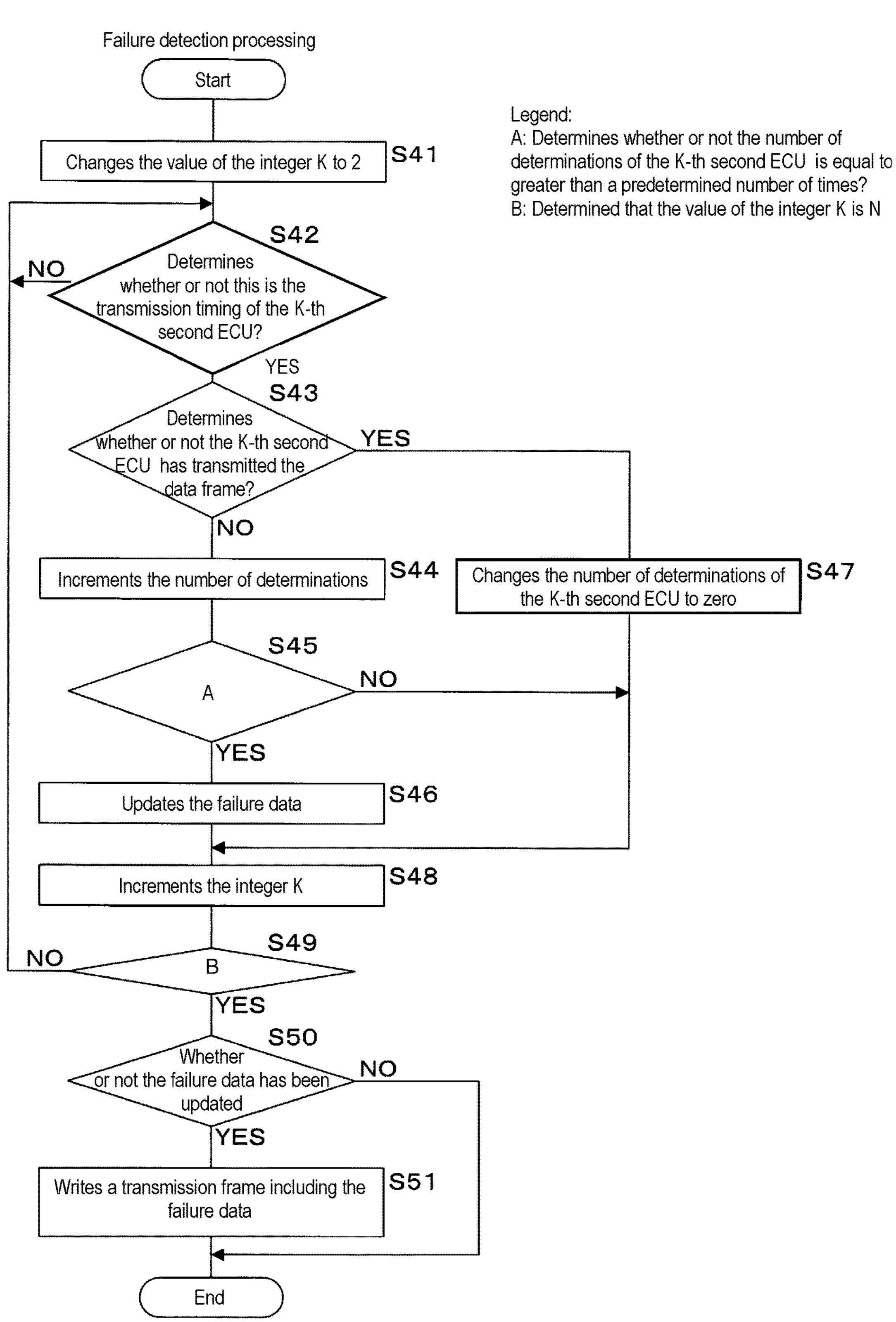
FIG. 11 is a flowchart showing the procedure of failure detection processing.

FIG. 11 is a flowchart showing the procedure of failure detection processing. As described above, the failure detection processing is performed by the IC control unit 31 of the first ECU 11. When the failure detection processing ends, the IC control unit 31 performs the failure detection processing again.

The value of an integer K is stored in the IC storage unit 33. The value of the integer K is changed by the IC control unit 31. The failure data is stored in the IC storage unit 33 of the first ECU 11. The second ECU 12 indicated by the failure data is updated by the IC control unit 31. As described above, if there is no second ECU 12 that has failed, the failure data indicates no failure.

In the failure detection processing, the IC control unit 31 of the first ECU 11 determines whether or not each of the (N−1) second ECUs 12 has transmitted a data frame. The second ECU 12 functions as a target communication device. For each of the second to N-th second ECUs 12, the number of consecutive determinations that no data frame was transmitted is stored in the IC storage unit 33. Each of the (N−1) numbers of determinations is changed by the IC control unit 31. When the first ECU 11 is activated, the (N−1) numbers of determinations are zero.

In the failure detection processing, first, the IC control unit 31 of the first ECU 11 changes the value of the integer K to 2 (step S41). Then, the IC control unit 31 determines whether or not this is the transmission timing of the K-th second ECU 12 (step S42). The K-th is the turn of transmitting the data frame, and is indicated by the order table. The transmission timing is a timing to transmit the data frame.

When it is determined that this is not the transmission timing of the K-th second ECU 12 (S42: NO), the IC control unit 31 executes step S42 again and waits until the transmission timing of the K-th second ECU 12 arrives. When it is determined that this is the transmission timing of the K-th second ECU 12 (S42: YES), the IC control unit 31 determines whether or not the K-th second ECU 12 has transmitted the data frame (step S43).

As described above, the data frame transmitted from one ECU connected to the communication bus B is received by all ECUs connected to the communication bus B. Therefore, when the bit communicator 35 has not received the data frame, the IC control unit 31 determines that the K-th second ECU 12 has not transmitted the data frame. When the bit communicator 35 receives the data frame, the IC control unit 31 determines that the K-th second ECU 12 has transmitted the data frame.

When it is determined that the K-th second ECU 12 has not transmitted the data frame (S43: NO), the IC control unit 31 increments the number of determinations of the K-th second ECU 12 by 1 (step S44). Then, the IC control unit 31 determines whether or not the number of determinations of the K-th second ECU 12 is a predetermined number of times (step S45). The predetermined number of times is a fixed value of 2 or more. When it is determined that the number of determinations of the K-th second ECU 12 is equal to or greater than the predetermined number of times (S45: YES), the IC control unit 31 updates the failure data assuming that a failure has occurred in the K-th second ECU 12 (step S46). In step S46, the IC control unit 31 adds the K-th second ECU 12 to the second ECU 12 indicated by the failure data. In the failure data, the K-th second ECU 12 is indicated by ID.

When it is determined that the K-th second ECU 12 has transmitted the data frame (S43: YES), the IC control unit 31 changes the number of determinations of the K-th second ECU 12 to zero (step S47). When it is determined that the number of determinations of the K-th second ECU 12 is less than the predetermined number of times (S45: NO) or after executing one of steps S46 and S47, the IC control unit 31 increments the integer K by 1 (step S48). Then, the IC control unit 31 determines whether or not the value of the integer K is N (step S49). When it is determined that the value of the integer K is not N (S49: NO), the IC control unit 31 executes step S42. The IC control unit 31 determines whether each of the (N−1) second ECUs 12 of the second to the N-th second ECUs 12 has transmitted the data frame.

When it is determined that the value of the integer K is N (S49: YES), the IC control unit 31 determines whether or not the failure data has been updated in the current failure detection processing (step S50). When it is determined that the failure data has been updated (S50: YES), the IC control unit 31 writes a transmission frame including the failure data in the IC storage unit 33 (step S51). Therefore, the bit communicator 35 transmits the transmission frame including the failure data through the communication bus B. The failure data is stored in the IC storage unit 33 of the second ECU 12. In the second ECU 12, when the bit communicator 35 receives the transmission frame including the failure data, the IC control unit 31 updates the failure data stored in the IC storage unit 33 to failure data included in the transmission frame received by the bit communicator 35.

When it is determined that the failure data has not been updated (S50: NO) or after executing step S51, the IC control unit 31 ends the failure detection processing. As described above, after the failure detection processing ends, the IC control unit 31 performs the failure detection processing again.

Update of Order Table

Figure 12:
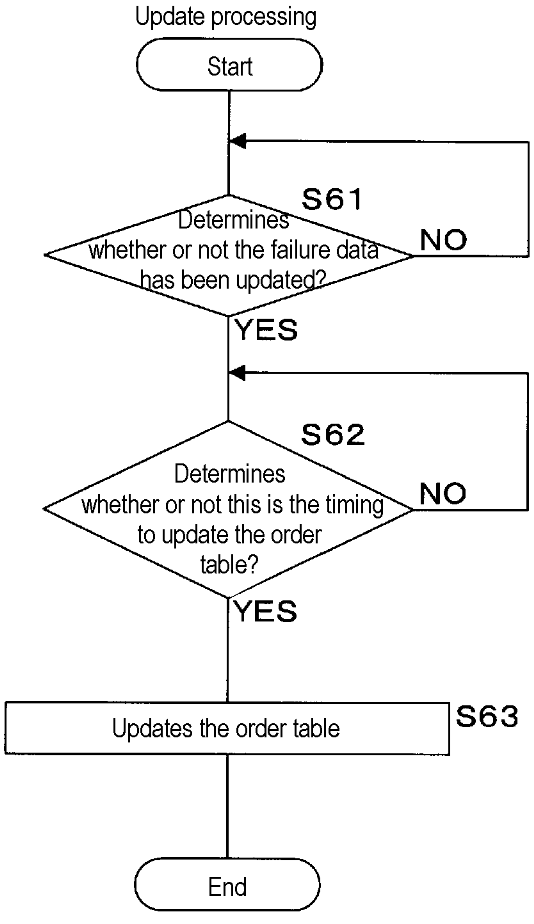
FIG. 12 is a flowchart showing the procedure of update processing.

FIG. 12 is a flowchart showing the procedure of update processing. The update processing is performed by the IC control units 31 of the first ECU 11 and the (N−1) second ECUs 12. In the update processing, the IC control unit 31 determines whether or not the failure data stored in the IC storage unit 33 has been updated (step S61). When it is determined that the failure data has not been updated (S61: NO), the IC control unit 31 executes step S61 again and waits until the failure data is updated in the IC storage unit 33.

When it is determined that the failure data has been updated (S61: YES), the IC control unit 31 determines whether or not this is the timing to update the order table (step S62). When it is determined that this is not the update timing of the order table (S62: NO), the IC control unit 31 executes step S62 again and waits until the update timing of the order table arrives. The update timing is, for example, a timing at which the communication IC 21 is activated or a timing at which the transmission of the next beacon signal is started. When it is determined that this is the update timing of the order table (S62: YES), the IC control unit 31 updates the order table based on the failure data stored in the IC storage unit 33 (step S63).

Figure 13:
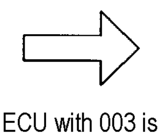
FIG. 13 is an explanatory diagram of updating an order table.

FIG. 13 is an explanatory diagram of updating the order table. As shown in FIG. 13, in the order table, each ID is associated with the turn of data frame transmission. In the example of FIG. 13, 001 to 005 correspond to the first to fifth, respectively. When the failure data indicates 003 as an ID, the IC control unit 31 deletes the column of 003 in the order table. Therefore, since the third is deleted, the fourth and fifth are changed to the third and fourth, respectively. As a result, the first ECU 11 and the three normal second ECUs 12 transmit data frames assuming that the second ECU 12 with 003 is not present.

As shown in FIG. 12, the IC control unit 31 ends the update processing after executing step S63. After the update processing ends, the IC control unit 31 performs the update processing again.

As described above, when it is determined a predetermined number of times consecutively that the target communication device included in the (N−1) second ECUs 12 has not transmitted data, the IC control unit 31 of the first ECU 11 detects the failure of the target communication device. Therefore, the possibility of erroneously detecting the failure of the target communication device is low.

When the failure of the target communication device is detected, the IC control unit 31 of the first ECU 11 updates the failure data and instructs the bit communicator 35 to transmit the updated failure data to the remaining second ECUs 12 other than the target communication device. Therefore, the failure data of the remaining second ECUs 12 is updated to match the failure data of the first ECU 11. Thereafter, the first ECU 11 and the normal second ECUs 12 update the transmission order indicated by the order table to an order in which the target communication device is excluded based on the updated failure data. As a result, when it is determined a predetermined number of times consecutively that the target communication device has not transmitted the data frame, the IC control unit 31 of the first ECU 11 changes the order in which the data frames are transmitted to the order in which the target communication device is excluded. The first ECU 11 also functions as a communication device that changes the order.

Figure 14:
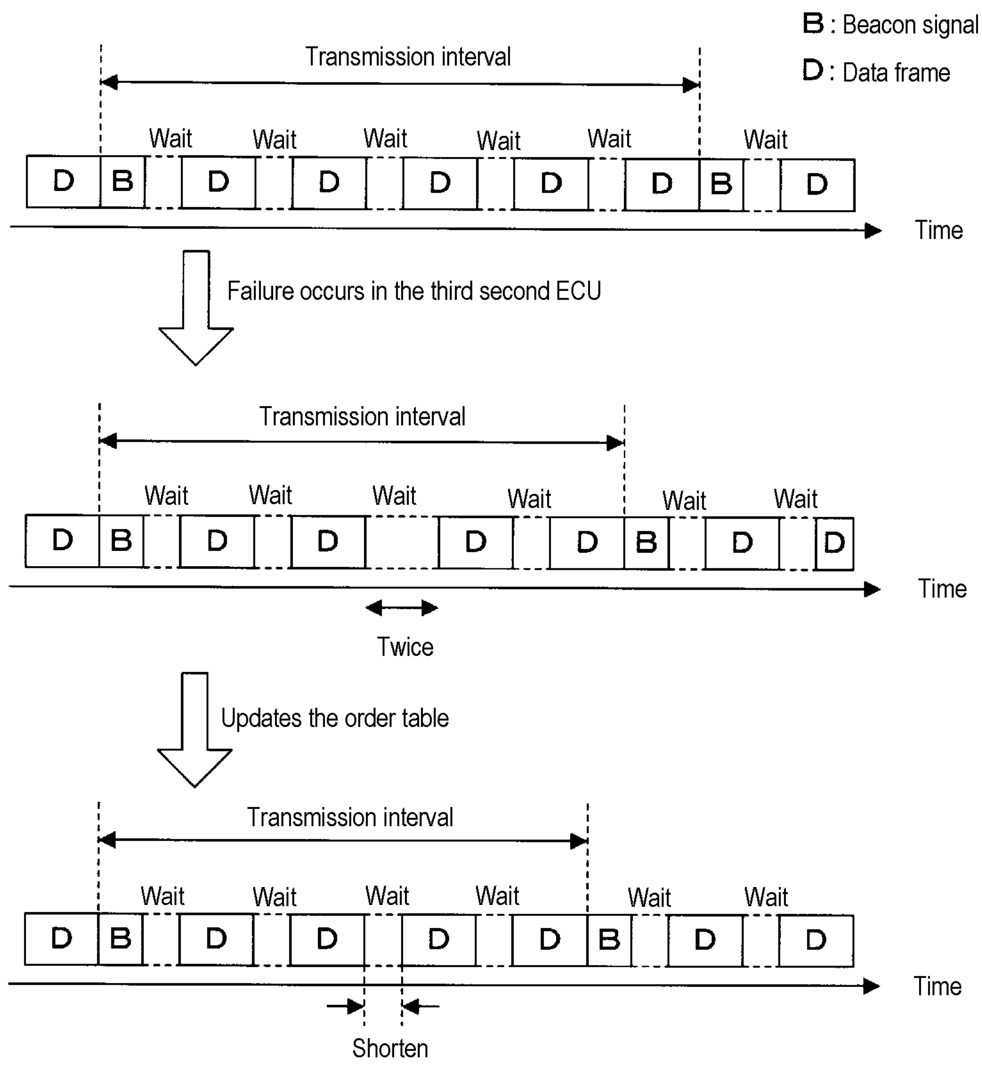
FIG. 14 is an explanatory diagram of the effects of the communication system.

FIG. 14 is an explanatory diagram of the effects of the communication system 1. FIG. 14 shows an example in which N is 5. When the first ECU 11 and the (N−1) second ECUs 12 are operating normally, as shown in the upper part of FIG. 14, when the first ECU 11 transmits a beacon signal, the first ECU 11 and the (N−1) second ECUs 12 transmit data frames according to the order indicated by the order table. When the second ECU 12 whose turn is the last ends the data frame, the first ECU 11 transmits the beacon signal again.

It is assumed that a failure occurs in the third second ECU 12 and the third second ECU 12 stops the transmission of the data frame. In this case, when the waiting period has passed from the end of the transmission of the data frame from the second second ECU 12, the third second ECU 12 does not transmit the data frame. For this reason, the fourth second ECU 12 transmits the data frame when a further waiting period has passed. Therefore, after the waiting period has passed twice from the end of the transmission of the data frame from the second second ECU 12, the fourth second ECU 12 starts the transmission of the data frame.

When a failure occurs in the third second ECU 12, the third second ECU 12 does not transmit the data frame. Therefore, the first ECU 11 can detect the failure of the third second ECU 12. When the first ECU 11 detects the failure of the third second ECU 12, the failure data is updated to indicate the third second ECU 12 as the second ECU 12 that has failed. The first ECU 11 transmits a transmission frame including the failure data, and the second, fourth, and fifth second ECUs 12 are notified of the failure of the third second ECU 12. As a result, the order indicated by the order table is updated in the first ECU 11 and the second, fourth, and fifth second ECUs 12.

As a result, the first ECU 11 and the (N−2) second ECUs 12 transmit data frames according to the order indicated by the updated order table. Since the waiting period has not passed twice, the transmission interval at which the beacon signal is transmitted is shortened. The data amount of data transmitted per unit time through the communication bus B is almost the same as the amount of data before the occurrence of the failure.

Second Embodiment

In the first embodiment 1, the waiting period is not changed. However, the waiting period may be changed according to the number of second ECUs 12 that have failed.

Hereinafter, the points of the second embodiment that are different from the first embodiment will be described. Since configurations other than those described later are the same as those of the first embodiment, the same components as in the first embodiment are denoted by the same reference numerals as in the first embodiment, and the description thereof will be omitted.

Configuration of First ECU 11

Figure 15:
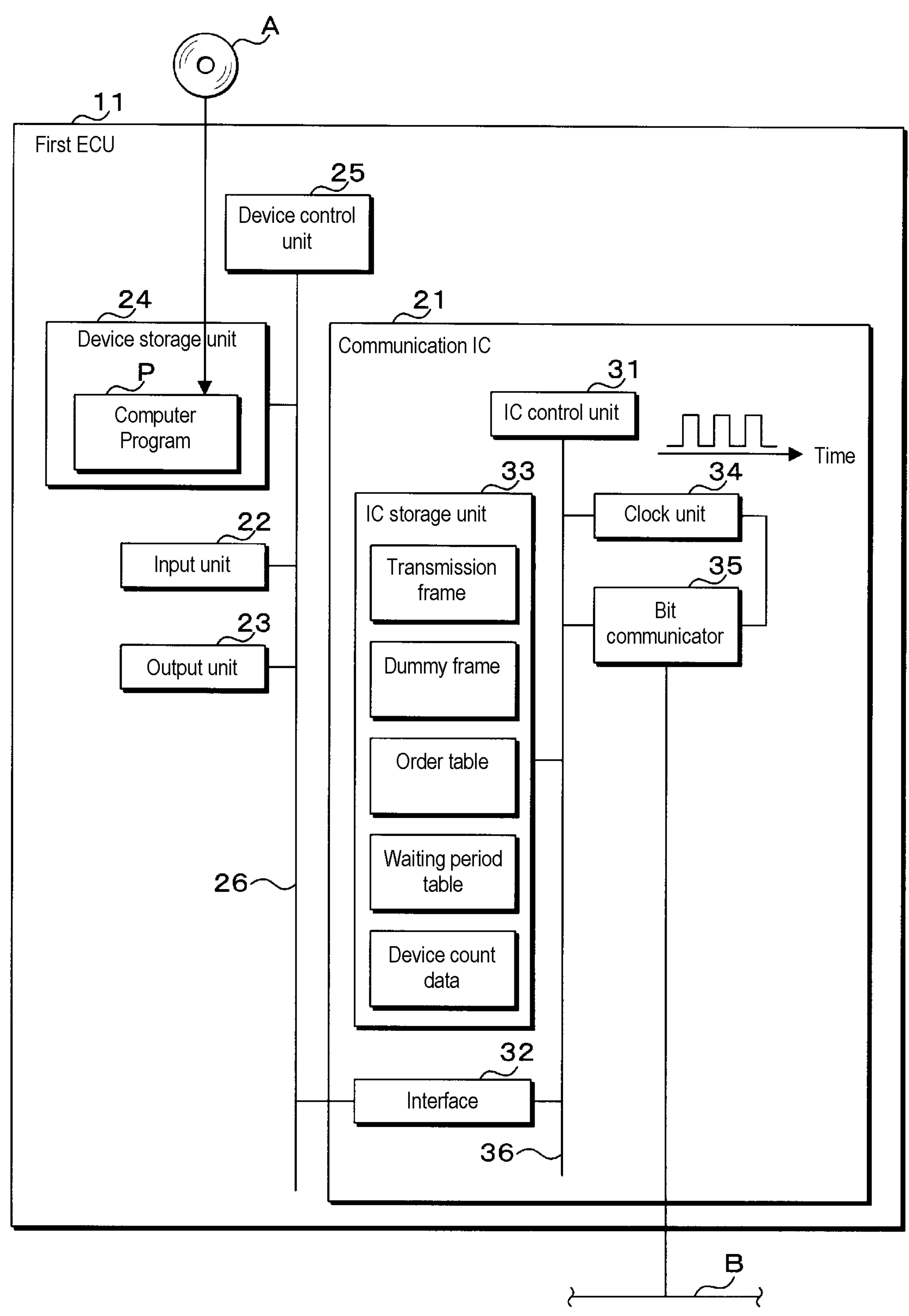
FIG. 15 is a block diagram showing the main configuration of a first ECU in a second embodiment.

FIG. 15 is a block diagram showing the main configuration of the first ECU 11 in the second embodiment. A waiting period table and device count data are stored in the IC storage unit 33 of the first ECU 11. Hereinafter, the number of first ECU 11 and normal ECUs in the (N−1) second ECUs 12 will be referred to as the number of devices. The device count data indicates the number of devices. The number of devices indicated by the device count data is changed by the IC control unit 31.

Figures 16, 17:
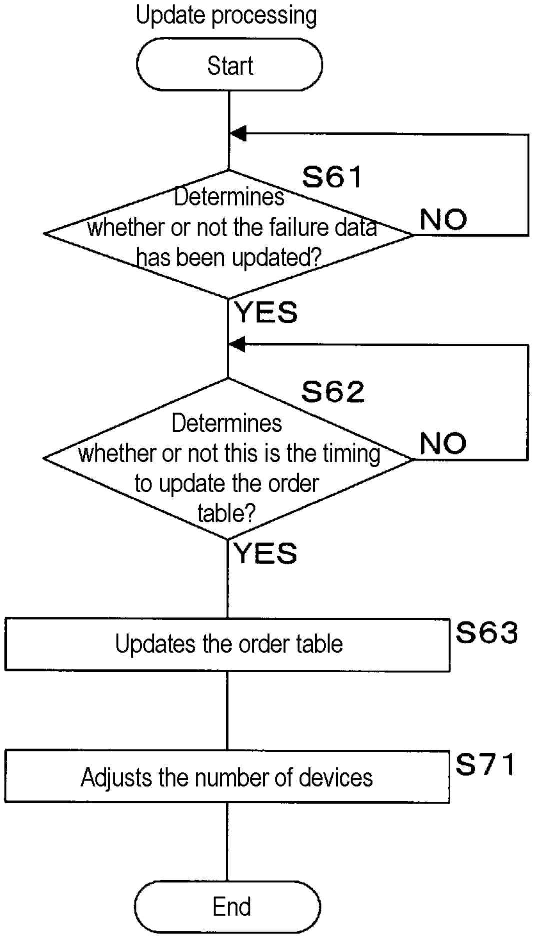
FIG. 16 is a chart showing the contents of a waiting period table.
FIG. 17 is a flowchart showing the procedure of update processing.

FIG. 16 is a chart showing the contents of the waiting period table. The waiting period table shows the relationship between the number of devices and the waiting period. As shown in FIG. 16, the smaller the number of devices, the longer the waiting period. FIG. 16 shows an example in which N is 5. The waiting period during which the IC control unit 31 of the first ECU 11 waits is a waiting period corresponding to the number of devices indicated by the device count data.

Configuration of Second ECU 12

The waiting period table and the device count data are also stored in the IC storage unit 33 of the second ECU 12. The waiting period tables stored in the IC storage units 33 of the first ECU 11 and the (N−1) second ECUs 12 are the same. The waiting period during which the IC control unit 31 of the second ECU 12 waits is also a waiting period corresponding to the number of devices indicated by the device count data.

Update of Order Table

FIG. 17 is a flowchart showing the procedure of update processing. As in the first embodiment, the update processing is performed by the IC control units 31 of the first ECU 11 and the (N−1) second ECUs 12. In the second embodiment, the IC control unit 31 executes steps S61 to S63 of the update processing in the same manner as in the first embodiment. Therefore, the description of steps S61 to S63 will be omitted. After executing step S63, the IC control unit 31 adjusts the number of devices indicated by the device count data to a value calculated by subtracting the number of second ECUs 12 indicated by the failure data from N (step S71). After executing step S71, the IC control unit 31 ends the adjustment processing. After the update processing ends, the IC control unit 31 performs the update processing again.

As described in the description of the first embodiment, the IC control unit 31 of the first ECU 11 updates the failure data when it is determined a plurality of times consecutively that the target communication device has not transmitted the data frame. In addition, the IC control unit 31 of the first ECU 11 instructs the bit communicator 35 to transmit the updated failure data to the remaining second ECUs 12 other than the target communication device. Therefore, the failure data of the remaining second ECUs 12 is updated to match the failure data of the first ECU 11. In the first ECU 11 and the normal second ECUs 12, when the failure data is updated, the number of devices is reduced. As a result, the waiting periods of the first ECU 11 and the normal second ECUs 12 are extended.

Effects of Communication System 1

Figure 18:
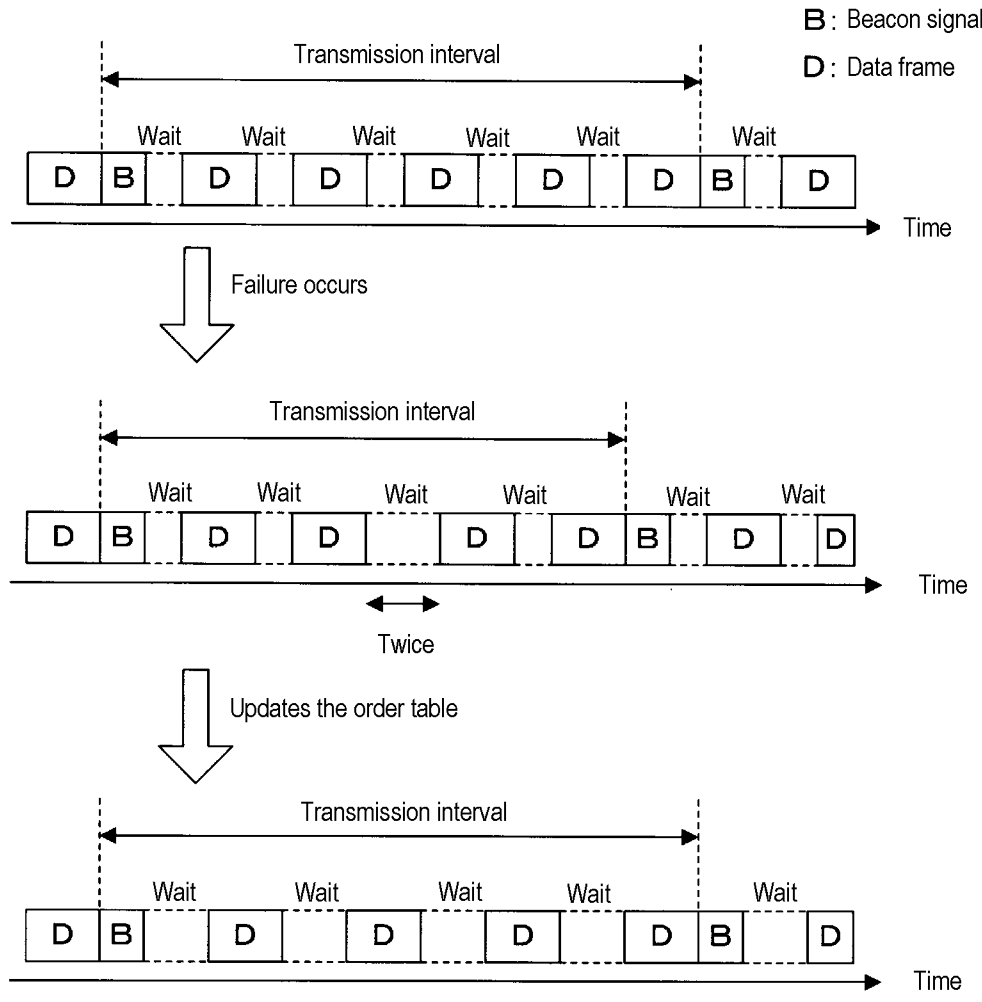
FIG. 18 is an explanatory diagram of the effects of the communication system.

FIG. 18 is an explanatory diagram of the effects of the communication system 1. FIG. 18 shows an example in which Nis 5. As in the first embodiment, when the first ECU 11 and the (N−1) second ECUs 12 are operating normally, as shown in the upper part of FIG. 18, each time the first ECU 11 transmits a beacon signal, the first ECU 11 and the (N−1) second ECUs 12 transmit data frames according to the order indicated by the order table.

When a failure occurs in the third second ECU 12, after the waiting period has passed twice from the end of the transmission of the data frame from the second second ECU 12, the fourth second ECU 12 starts the transmission of the data frame. Thereafter, the failure data is updated, and the first ECU 11 and the (N−2) normal second ECUs 12 transmit data frames according to the order indicated by the order table.

In the second embodiment, when the failure of the third second ECU 12 is detected, the number of devices is changed from N to (N−1), and the waiting period is extended. Therefore, it is possible to prevent a decrease in the transmission interval at which the beacon signal is transmitted. The waiting period in the waiting period table is set so that the transmission interval is a fixed value regardless of the number of devices. The communication system 1 according to the second embodiment similarly has the effects of the communication system 1 according to the first embodiment except for the effect obtained by maintaining the waiting period constant regardless of the number of devices.

Characteristics of Communication Systems 1 According to First and Second Embodiments FIG. 19 is an explanatory diagram of the characteristics of the communication systems 1 according to the first and second embodiments. FIG. 19 shows the transmission of a data frame after the order table has been updated in each of the first and second embodiments (see the lower parts of FIGS. 14 and 18). In the first and second embodiments, the first ECU 11 and the (N−2) second ECUs 12 transmit data frames in order, assuming that there is no second ECU 12 that has failed.

In the communication bus B, the voltage difference between the first conducting wire W1 and the second conducting wire W2 is switched to a low level voltage or a high level voltage. The sum of the number of times of switching from the high level voltage to the low level voltage and the number of times of switching from the low level voltage to the high level voltage is referred to as the number of times of switching of the voltage of the communication bus B. When the voltage of the communication bus B is switched, disturbance noise is generated from the communication bus B. The disturbance noise is noise that interferes with a signal output through a conducting wire different from the communication bus B. If the disturbance noise is large, there is a possibility that the signal output through the conducting wire different from the communication bus B, for example, an operating signal, will be erroneously read.

In the communication system 1 according to the first embodiment, when a failure occurs in one second ECU 12, the waiting period is not changed. For this reason, the beacon signal transmission interval is reduced. As a result, the data amount of data transmitted per unit time through the communication bus B is almost the same as the amount of data before the occurrence of the failure. However, since the beacon signal transmission interval is reduced, the number of times of switching per unit time in the communication bus B increases. Therefore, the intensity of the disturbance noise increases.

On the other hand, in the communication system 1 according to the second embodiment, when a failure occurs in one second ECU 12, the waiting period is extended. For this reason, the data amount of data transmitted per unit time is reduced from the amount of data before the occurrence of the failure. However, since the beacon signal transmission interval does not change, the number of times of switching per unit time in the communication bus B hardly changes. As a result, the intensity of the disturbance noise hardly changes.

Figure 20:
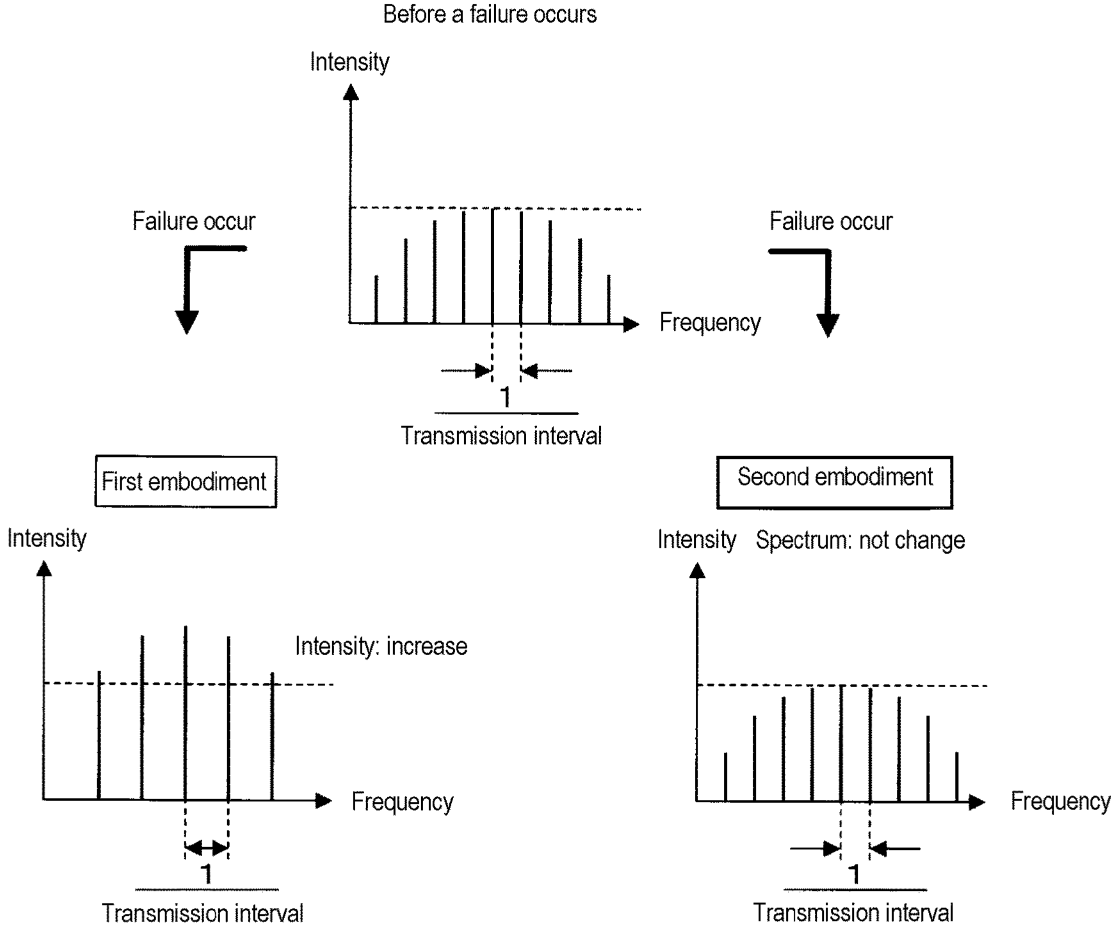
FIG. 20 is an explanatory diagram of other characteristics of the communication systems according to the first and second embodiments.

FIG. 20 is an explanatory diagram of other characteristics of the communication systems 1 according to the first and second embodiments. FIG. 20 shows the spectrum of a signal (data) propagating through the communication bus B before a failure occurs in the second ECU 12. Frequency and intensity are shown on the horizontal and vertical axes, respectively. As shown in FIG. 20, a plurality of spectra are excited, and the frequency interval of the excited spectra is represented by the reciprocal of the beacon signal transmission interval.

In the communication system 1 according to the first embodiment, when a failure occurs in the second ECU 12, the beacon signal transmission interval is reduced as described above. This increases the frequency interval of the spectrum. Therefore, since the number of excited spectra is reduced, the intensity of each spectrum increases. As a result, the intensity of the spectrum acting as disturbance noise increases.

On the other hand, in the communication system 1 according to the second embodiment, even if a failure occurs in the second ECU 12, the beacon signal transmission interval does not change as described above. Therefore, even if a failure occurs in the second ECU 12, the spectrum of the signal (data) propagating through the communication bus B does not change. As a result, the intensity of the spectrum acting as disturbance noise does not change.

Third Embodiment

In the second embodiment, the beacon signal transmission interval is maintained regardless of the number of second ECUs 12 that have failed. However, it is not necessary to maintain the beacon signal transmission interval regardless of the number of second ECUs 12 that have failed.

Hereinafter, the points of the third embodiment that are different from the second embodiment will be described. Since configurations other than those described later are the same as those of the second embodiment, the same components as in the second embodiment are denoted by the same reference numerals as in the second embodiment, and the description thereof will be omitted.

Data Frame Transmission Method

FIG. 21 is an explanatory diagram of a data frame transmission method according to the third embodiment. FIG. 21 shows an example in which Nis 5. In the communication system 1 according to the third embodiment, when the beacon signal transmission interval is equal to or longer than a predetermined interval, the intensity of the disturbance noise is low. For this reason, the possibility that the signal output through the conducting wire different from the communication bus B will be erroneously read is low. In addition, the predetermined interval is shorter than the beacon signal transmission interval before a failure occurs in the second ECU 12.

When the number of normal second ECUs 12 is P or more, the beacon signal transmission interval is equal to or longer than the predetermined interval. Therefore, in the communication system 1 according to the third embodiment, when the number of normal second ECUs 12 is P or more, the beacon signal transmission interval is reduced as in the first embodiment. When the number of normal second ECUs 12 is less than P, the beacon signal transmission interval is maintained as in the second embodiment. Therefore, the beacon signal transmission interval is maintained at a value equal to or greater than the predetermined interval while suppressing a decrease in the data amount of data transmitted per unit time. FIG. 21 shows an example in which P is 2. P is less than (N−1).

Contents of Waiting Period Table

FIG. 22 is a chart showing the contents of a waiting period table. When the second and third embodiments are compared, the contents of the waiting period tables are different. As described in the description of the second embodiment, the number of devices indicated by the device count data is the number of first ECU 11 and normal ECUs among the (N−1) second ECUs 12. FIG. 22 shows an example in which N and P are 8 and 4, respectively. As shown in FIG. 22, when the number of devices is (P+1) or more, the waiting period is a common value. Therefore, when a failure occurs in the second ECU 12, if the number of normal second ECUs 12 is (P+1) or more, the waiting period is not changed, and the beacon signal transmission interval is reduced.

When the number of devices is P or less, the smaller the number of normal second ECUs 12, the longer the waiting period. Therefore, when a failure occurs in the second ECU 12, if the number of normal second ECUs 12 is (P−1) or less, the waiting period is extended.

Effects of Communication System 1

In the communication system 1 according to the third embodiment, the beacon signal transmission interval is maintained at a value equal to or greater than the predetermined interval while suppressing a decrease in the disease amount of data transmitted per unit time. The communication system 1 according to the third embodiment has the same effects as those of the communication systems 1 according to the first and second embodiments.

Modification Examples of Second and Third Embodiments

In the communication systems 1 according to the second and third embodiments, the method of maintaining the beacon signal transmission interval is not limited to the method of extending the waiting period. For example, the beacon signal transmission interval may be maintained by increasing the data amount of the data frame instead of extending the waiting period. Increasing the data amount of the data frame is realized, for example, by increasing the data amount of the main data.

Fourth Embodiment

In the first embodiment, the first ECU 11 and the (N−1) second ECUs 12 transmit dummy frames. However, the first ECU 11 and the (N−1) second ECUs 12 may include an ECU that does not transmit a dummy frame.

Hereinafter, the points of the fourth embodiment that are different from the first embodiment will be described. Since configurations other than those described later are the same as those of the first embodiment, the same components as in the first embodiment are denoted by the same reference numerals as in the first embodiment, and the description thereof will be omitted.

Data Frame Transmission Method

Figure 23:
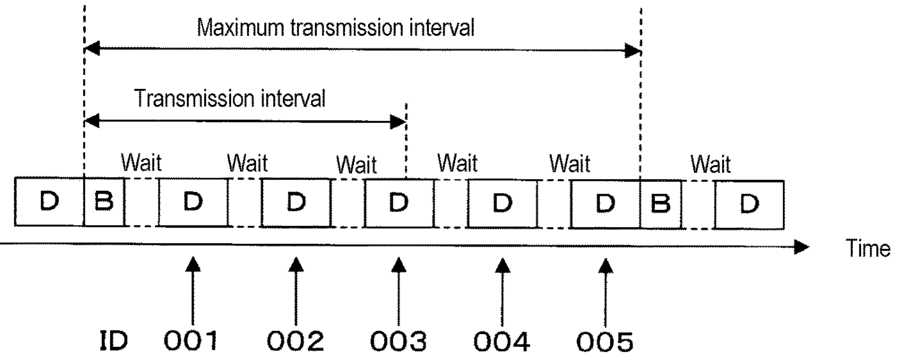
FIG. 23 is an explanatory diagram of a data frame transmission method according to a fourth embodiment.

FIG. 23 is an explanatory diagram of a data frame transmission method according to the fourth embodiment. FIG. 23 shows an example in which N is 5. As in the third embodiment, when the beacon signal transmission interval is equal to or longer than a predetermined interval, the intensity of the disturbance noise is low. For this reason, the possibility that the signal output through the conducting wire different from the communication bus B will be erroneously read is low. In the communication system 1 according to the fourth embodiment, when U ECUs transmit data frames, the beacon signal transmission interval is equal to or longer than the predetermined interval. U is a natural number less than N. FIG. 23 shows an example in which U is 3.

In the communication system 1 according to the fourth embodiment, each of (N-U) ECUs among the first ECU 11 and the (N−1) second ECUs 12 does not transmit a dummy frame. When a failure occurs in one of the U ECUs, one of the (N-U) ECUs starts the transmission of a dummy frame. Therefore, the beacon signal transmission interval is maintained at a value equal to or greater than the predetermined interval.

Procedure for Transmitting Data Frame

In a configuration in which the first ECU 11 transmits a dummy frame, the IC control unit 31 of the first ECU 11 performs transmission processing in the same manner as in the first embodiment.

In the configuration in which the first ECU 11 does not transmit a dummy frame, the IC control unit 31 of the first ECU 11 similarly executes steps S21 to S26 of the transmission processing, which is performed by the IC control unit 31 of the first ECU 11 that transmits the dummy frame, in the transmission processing. When it is determined that the transmission frame is not stored in the IC storage unit 33 (S24: NO), the IC control unit 31 ends the transmission processing without executing step S27.

In a configuration in which the second ECU 12 transmits a dummy frame, the IC control unit 31 of the second ECU 12 performs transmission processing in the same manner as in the first embodiment.

In the configuration in which the second ECU 12 does not transmit a dummy frame, the IC control unit 31 of the second ECU 12 similarly executes steps S31 to S36 of the transmission processing, which is performed by the IC control unit 31 of the second ECU 12 that transmits the dummy frame, in the transmission processing. When it is determined that the transmission frame is not stored in the IC storage unit 33 (S34: NO), the IC control unit 31 ends the transmission processing without executing step S37.

In the communication system 1 according to the fourth embodiment, when no transmission frame is present in the IC storage unit 33, each of the U ECUs transmits a dummy frame. When no transmission frame is present in the IC storage unit 33, each of the (N-U) ECUs does not transmit a dummy frame.

When the first ECU 11 is included in the U ECUs, the IC control unit 31 of the first ECU 11 performs transmission processing in the same manner as in the first embodiment. When the first ECU 11 is included in (N-U) ECUs, the IC control unit 31 of the first ECU 11 performs transmission processing in which step S27 is omitted. In this case, the first ECU 11 functions as a non-transmission device.

When the second ECU 12 is included in the U ECUs, the IC control unit 31 of the second ECU 12 included in the U ECUs performs transmission processing in the same manner as in the first embodiment. When the second ECU 12 is included in the (N-U) ECUs, the IC control unit 31 of the second ECU 12 included in the (N-U) ECUs performs transmission processing in which step S37 is omitted. The second ECU 12 included in the (N-U) ECUs functions as a non-transmission device.

Failure Detection Processing

Figure 24:
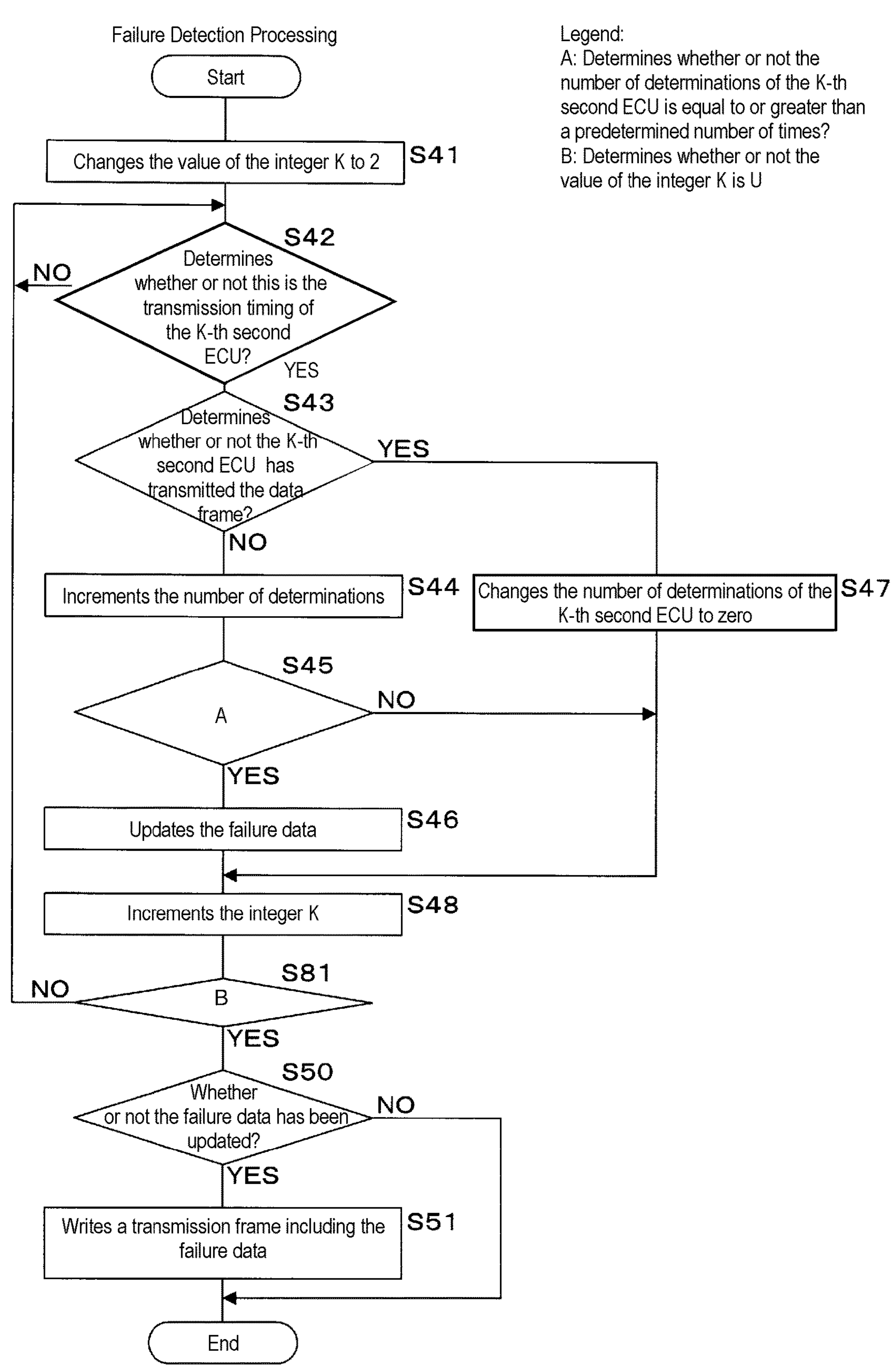
FIG. 24 is a flowchart showing the procedure of failure detection processing.

FIG. 24 is a flowchart showing the procedure of failure detection processing. As in the first embodiment, the IC control unit 31 of the first ECU 11 performs the failure detection processing. FIG. 24 shows an example in which the first to U-th ECUs among the first ECU 11 and the (N−1) second ECUs 12 transmit dummy frames. The IC control unit 31 of the first ECU 11 in the fourth embodiment executes steps S41 to S48, S50, and S51 in the same manner as in the first embodiment. Therefore, the description of steps S41 to S48, S50, and S51 will be omitted.

After executing step S48, the IC control unit 31 of the first ECU 11 determines whether or not the value of the integer K is U (step S81). When it is determined that the value of the integer K is not U (S81: NO), the IC control unit 31 executes step S42. When it is determined that the value of the integer K is U (S81: YES), the IC control unit 31 executes step S50.

As described above, the IC control unit 31 of the first ECU 11 detects the occurrence of a failure in each of the (U−1) second ECUs 12.

Update of Order Table

The IC control unit 31 of each of the first ECU 11 and the second ECU 12 that transmits a dummy frame performs update processing in the same manner as in the first embodiment.

Figure 25:
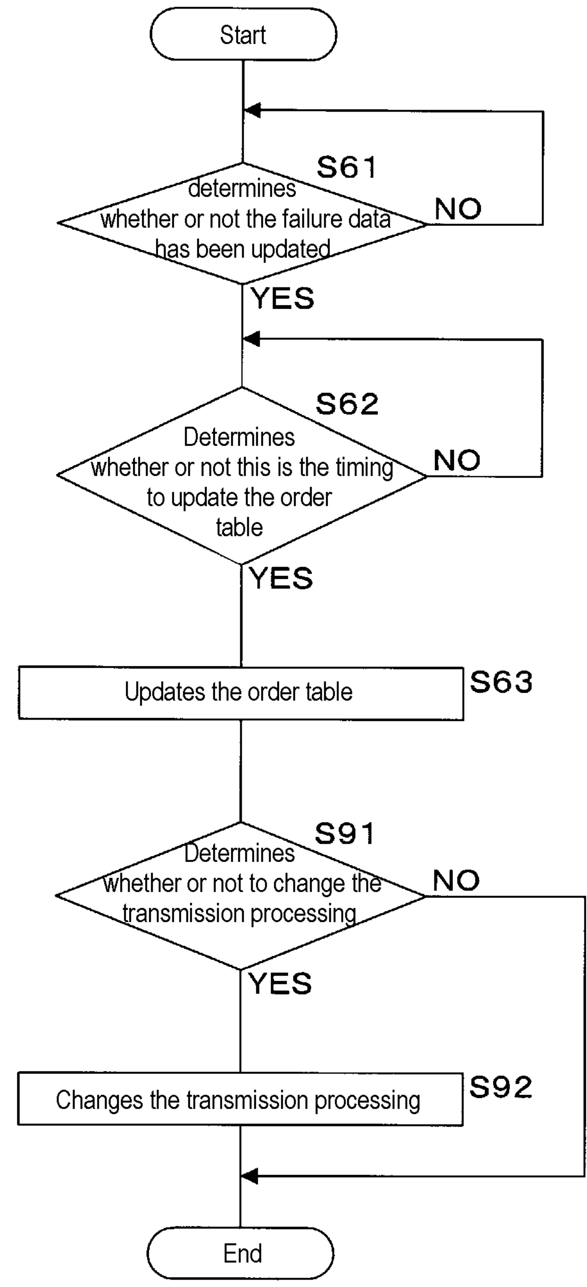
FIG. 25 is a flowchart showing the procedure of update processing of a second ECU that does not transmit a dummy frame.

FIG. 25 is a flowchart showing the procedure of update processing of the second ECU 12 that does not transmit a dummy frame. In the update processing, the IC control unit 31 of the second ECU 12 that does not transmit a dummy frame similarly executes steps S61 to S63 of the update processing performed by the IC control unit 31 of the second ECU 12 that transmits the dummy frame. Therefore, the description of steps S61 to S63 will be omitted.

After executing step S63, the IC control unit 31 of the second ECU 12 that does not transmit a dummy frame determines whether or not to change the transmission processing to transmission processing for transmitting the dummy frame (step S91). For example, the IC control unit 31 of the (U+1)-th second ECU 12 determines that the transmission processing is to be changed when the number of second ECUs 12 that have failed is one. The IC control unit 31 of the (U+2)-th second ECU 12 determines that the transmission processing is to be changed when the number of second ECUs 12 that have failed is two.

When it is determined that the transmission processing is to be changed (S91: YES), the IC control unit 31 changes the transmission processing to transmission processing for transmitting the dummy frame (step S92). When it is determined that the transmission processing is not to be changed (S91: NO) or after executing step S92, the IC control unit 31 ends the update processing. After the update processing ends, the IC control unit 31 performs the update processing again.

As described in the description of the first embodiment, in the first ECU 11, the IC control unit 31 updates the failure data stored in the IC storage unit 33 when it is determined a predetermined number of times consecutively that the target communication device has not transmitted the data frame. In addition, the IC control unit 31 of the first ECU 11 instructs the bit communicator 35 to transmit a transmission frame including the failure data to the (N−1) second ECUs 12. Therefore, the IC control unit 31 of the second ECU 12 that does not transmit the dummy frame performs update processing to change the transmission processing. As described above, when it is determined a predetermined number of times consecutively that the target communication device has not transmitted the data frame, the IC control unit 31 causes the second ECU 12 that does not transmit the dummy frame to start the transmission of the dummy frame.

Effects of Communication System 1

In the communication system 1 according to the fourth embodiment, when a failure of the target communication device is detected, the second ECU 12 that does not transmit a dummy frame starts the transmission of the dummy frame. Therefore, it is possible to prevent a decrease in the beacon signal transmission interval.

The communication system 1 according to the fourth embodiment has the same effects as those of the communication system 1 according to the first embodiment.

Modification Examples of Fourth Embodiment

In the fourth embodiment, ECUs that do not transmit dummy frames may be included in the first to U-th ECUs. In this case, an ECU that transmits a dummy frame to the remaining ECUs is included. The IC control unit 31 of the first ECU 11 determines whether or not a failure has occurred in order for each of the (U−1) second ECUs 12 that transmit dummy frames. In addition, the first ECU 11 may be an ECU that does not transmit a dummy frame. In this case, the first ECU 11 performs update processing similar to the update processing of the second ECU 12 that does not transmit the dummy frame.

Modification Examples of First to Fourth Embodiments

In the first to fourth embodiments, the dummy frame may be a data frame whose transmission destination matches the transmission source. In this case, when the bit communicator 35 receives a data frame, the IC control unit 31 of each of the first ECU 11 and the (N−1) second ECUs 12 discards the received data frame if the transmission destination and the transmission source of the received data frame are the same. In addition, if the transmission destination of the data frame is limited to one, it is not possible to notify the normal second ECUs 12 of the failure by one transmission of the transmission frame including the failure data. In this case, the first ECU 11 realizes the failure notification by transmitting a plurality of transmission frames whose transmission destinations are different.

In addition, when it is determined a predetermined number of times that the target communication device has not transmitted the data frame, the IC control unit 31 of the first ECU 11 may change the order in which the data frames are transmitted to the order in which the target communication device is excluded. In this case, the number of determinations of the K-th second ECU 12 is the total number of times that no data frame has been transmitted to the K-th second ECU 12. In addition, the predetermined number of times may be one. In this case, steps S44, S45, and S47 of the failure detection processing are omitted. In the failure detection processing, when it is determined that the K-th second ECU 12 has not transmitted the data frame (S43: NO), the IC control unit 31 of the first ECU 11 executes step S46. When it is determined that the K-th second ECU 12 has transmitted the data frame (S43: YES), the IC control unit 31 executes step S48.

The ECU that detects a failure is not limited to the first ECU 11, and may be the second ECU 12. In this case, the first ECU 11 functions as a second communication device. The transmission destination of the transmission frame including the failure data is a normal ECU. The second ECU 12 that detects a failure functions as a communication device that changes the order. The number of ECUs that detect failures is not limited to one. Each of the first ECU 11 and the (N−1) second ECUs 12 may detect a failure of the second ECU 12 that transmits a dummy frame. In this case, the transmission of the data frame including the failure data is not necessary. When a failure of the second ECU 12 is detected, the IC control unit 31 of each of the first ECU 11 and the (N−1) second ECUs 12 changes the turn of itself to an immediately preceding turn if the turn of the second ECU 12 that has failed is before the turn of itself.

In each of the first ECU 11 and the second ECU 12, the device control unit 25 may perform the transmission processing instead of the IC control unit 31. In addition, in each of the first ECU 11 and the second ECU 12, the device control unit 25 and the IC control unit 31 may cooperate with each other to perform the transmission processing. In addition, the device connected to the communication bus B is not limited to the ECU. There is no problem as long as the device connected to the communication bus B is a communication device that transmits data through the communication bus B.

The method of grasping the timing at which the transmission of the data frame ends is not limited to the method based on the data length. When an EOF field indicating the end of transmission is provided at the end of the data frame, the timing at which the transmission of the EOF field ends is the timing at which the transmission of the data frame ends. EOF is an abbreviation for End Of Frame. The waveform of the EOF field is set in advance.

It should be considered that the first to fourth embodiments disclosed are examples in all points and not restrictive. The scope of the present disclosure is defined by the claims rather than the meanings set forth above, and is intended to include all modifications within the scope and meaning equivalent to the claims.

The above descriptions include the features appended below.

In the communication system 1, when a beacon signal is transmitted, the first ECU 11 and the plurality of second ECUs 12 transmit data frames through the communication bus B according to an order set in advance. A dummy frame whose transmission destination is different from the first ECU 11 and the plurality of second ECUs 12 is transmitted through the communication bus B. The first ECU 11 determines whether or not the second ECU 12 has transmitted the data frame at the timing at which the second ECU 12 transmits the data frame. The first ECU 11 changes the order of transmission when it is determined that the second ECU 12 has not transmitted the data frame.

The invention claimed is:

1. A communication device for transmitting data through a communication bus, comprising:
- a processing unit that performs processing,
- wherein, when a beacon signal is transmitted, the processing unit determines whether or not a target communication device included in a plurality of second communication devices has transmitted data at a timing at which the target communication device transmits one of data pieces transmitted through the communication bus according to an order set in advance by the communication device itself and the plurality of second communication devices,
- when it is determined that the target communication device has transmitted no data, the processing unit changes the order, and
- the data transmitted through the communication bus includes dummy data whose transmission destination is different from the transmission source of the communication device itself and the plurality of second communication devices.

2. The communication device according to claim 1, wherein the processing unit changes the order when it is determined a plurality of times consecutively that the target communication device has transmitted no data.

3. The communication device according to claim 2, further including;
- a signal transmission unit that repeatedly transmits the beacon signal.

4. The communication device according to claim 2, further including;
- a data transmission unit that transmits data,
- wherein the data transmission unit transmits data at a timing at which a first predetermined period has passed from an end of transmission of the beacon signal or at a timing at which a second predetermined period has passed from an end of transmission of data from a second communication device with an immediately preceding turn, and
- when it is determined that the target communication device has transmitted no data, the processing unit extends the first predetermined period or the second predetermined period.

5. The communication device according to claim 1, further including;
- a signal transmission unit that repeatedly transmits the beacon signal.

6. The communication device according to claim 5, further including;
- a data transmission unit that transmits data,
- wherein the data transmission unit transmits data at a timing at which a first predetermined period has passed from an end of transmission of the beacon signal or at a timing at which a second predetermined period has passed from an end of transmission of data from a second communication device with an immediately preceding turn, and
- when it is determined that the target communication device has transmitted no data, the processing unit extends the first predetermined period or the second predetermined period.

7. The communication device according to claim 1, further including;
- a data transmission unit that transmits data,
- wherein the data transmission unit transmits data at a timing at which a first predetermined period has passed from an end of transmission of the beacon signal or at a timing at which a second predetermined period has passed from an end of transmission of data from a second communication device with an immediately preceding turn, and
- when it is determined that the target communication device has transmitted no data, the processing unit extends the first predetermined period or the second predetermined period.

8. A communication system, comprising:
- a plurality of communication devices connected to a communication bus,
- wherein the plurality of communication devices transmit data through the communication bus according to an order set in advance when a beacon signal is transmitted,
- when there is no transmission data to be transmitted to one of remaining communication devices other than a target communication device included in the plurality of communication devices, the target communication device transmits dummy data whose transmission destination is different from the remaining communication devices,
- a communication device different from the target communication device among the plurality of communication devices includes a processing unit that performs processing, and
- the processing unit determines whether or not the target communication device has transmitted data at a timing at which the target communication device transmits data, and changes the order when it is determined that the target communication device has transmitted no data.

9. The communication system according to claim 8,
- wherein the plurality of communication devices include a non-transmission device that does not transmit the dummy data, and
- when it is determined that the target communication device has transmitted no data, the processing unit causes the non-transmission device to start transmission of the dummy data.

* * * * *